United States Patent [19]

Ueno et al.

[11] Patent Number: 4,698,972
[45] Date of Patent: Oct. 13, 1987

[54] METHOD OF AND APPARATUS FOR CONTROLLING SUPERCHARGE PRESSURE FOR A TURBOCHARGER

[75] Inventors: Takashi Ueno, Yokosuka; Toshimi Abo, Yokohama, both of Japan

[73] Assignee: Nissan Motor Co., Ltd., Yokohama, Japan

[21] Appl. No.: 804,528

[22] Filed: Dec. 4, 1985

[30] Foreign Application Priority Data

Dec. 7, 1984 [JP] Japan ................................ 59-258552

[51] Int. Cl.$^4$ ............................................. F02D 23/00
[52] U.S. Cl. .................................................... 60/602
[58] Field of Search ................ 60/600, 601, 602, 603

[56] References Cited

FOREIGN PATENT DOCUMENTS

| | | |
|---|---|---|
| 0136541 | 4/1985 | European Pat. Off. |
| 146023 | 9/1982 | Japan .................. 60/602 |
| 18522 | 2/1983 | Japan .................. 60/602 |
| 60-56126 | 4/1985 | Japan . |
| 60-56127 | 4/1985 | Japan . |
| 60-56128 | 4/1985 | Japan . |
| 60-139037 | 9/1985 | Japan . |
| 60-178931 | 9/1985 | Japan . |
| 60-182317 | 9/1985 | Japan . |
| 60-182318 | 9/1985 | Japan . |
| 60-182319 | 9/1985 | Japan . |
| 60-182321 | 9/1985 | Japan . |
| 60-209632 | 10/1985 | Japan . |
| 60-228728 | 11/1985 | Japan . |
| 60-240829 | 11/1985 | Japan . |
| 60-256540 | 12/1985 | Japan . |
| 61-49104 | 3/1986 | Japan . |
| 61-55316 | 3/1986 | Japan . |
| 61-65020 | 4/1986 | Japan . |
| 61-65021 | 4/1986 | Japan . |
| 61-138828 | 6/1986 | Japan . |
| 61-138829 | 6/1986 | Japan . |
| 61-138830 | 6/1986 | Japan . |
| 61-155624 | 7/1986 | Japan . |
| 61-164042 | 7/1986 | Japan . |
| 61-169625 | 7/1986 | Japan . |

*Primary Examiner*—Stephen F. Husar
*Attorney, Agent, or Firm*—Schwartz, Jeffery, Schwaab, Mack, Blumenthal & Evans

[57] ABSTRACT

Apparatus for controlling supercharge pressure for a turbocharger comprising means for determining any of operating zones to which a feedback control is applied, means for calculating a deviation between actual supercharge pressure and a target or preset supercharge pressure in accordance with the operating conditions of the engine, and means for selectively controlling capacity changing means and exhaust gas bypass valve means in accordance with the results of decisions and calculations, in which a control amount for the capacity changing means can be controlled in the direction of gradual increase in the capacity of the exhaust gas turbine or in the direction of decrease in the opening of the capacity changing means after the control is changed-over from the capacity changing means to the exhaust gas bypass valve means. Various data corresponding to the control steps for realizing the method are stored in a ROM of a microprocessor of an electronic control unit.

12 Claims, 26 Drawing Figures

FIG. 5 (B)
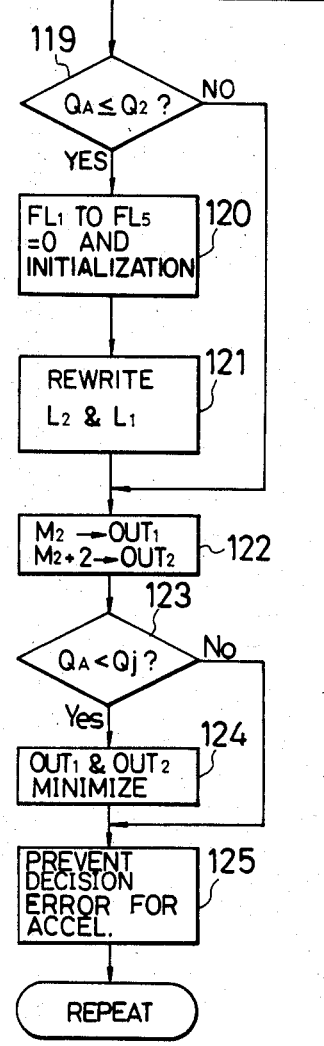
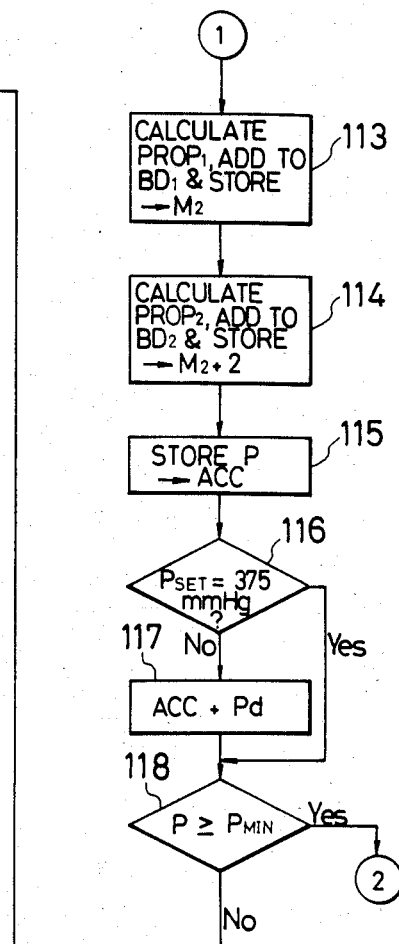

FIG. 7
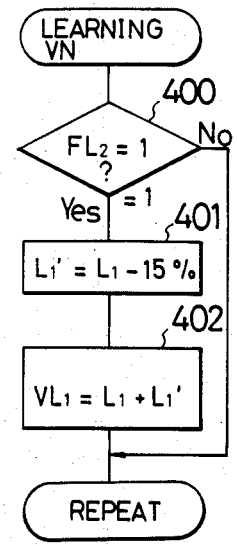
FIG. 8
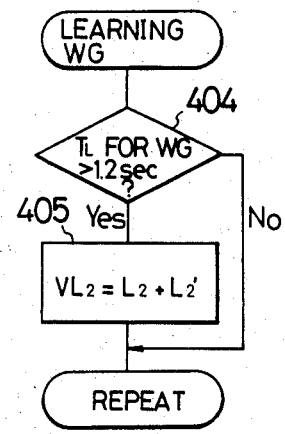
FIG. 9(A)
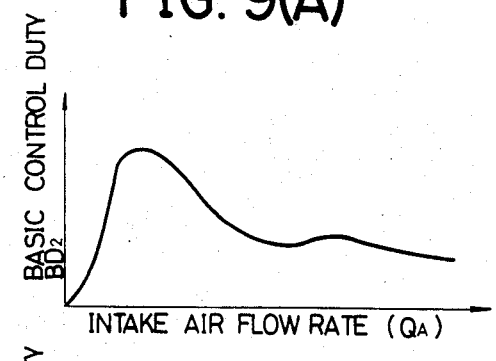
FIG. 9(B)
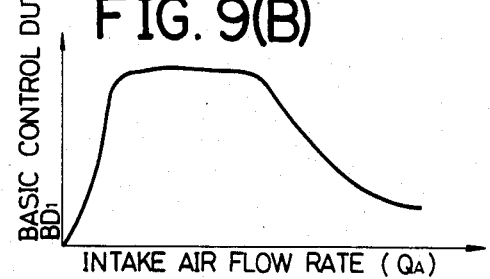
FIG. 9(C)
| QS | ADDRESS | CONT. DUTY |
|---|---|---|
| 0 0 | 0 | 0 3 |
| 0 1 | 1 | F 0H |
| ⋮ | ⋮ | ⋮ |
| OFFH | OFFH | 30H |

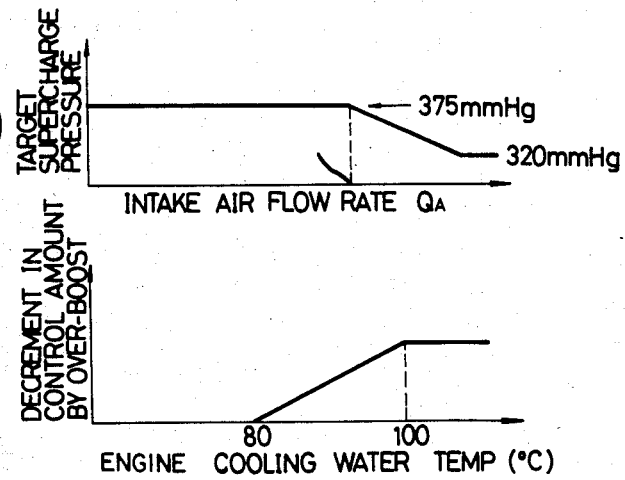
FIG. 10(A)
FIG. 10(B)
FIG. 11
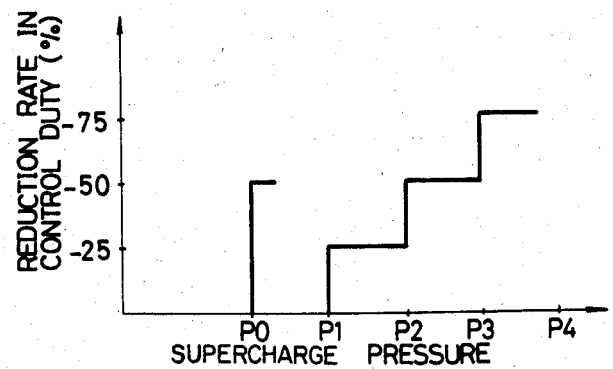

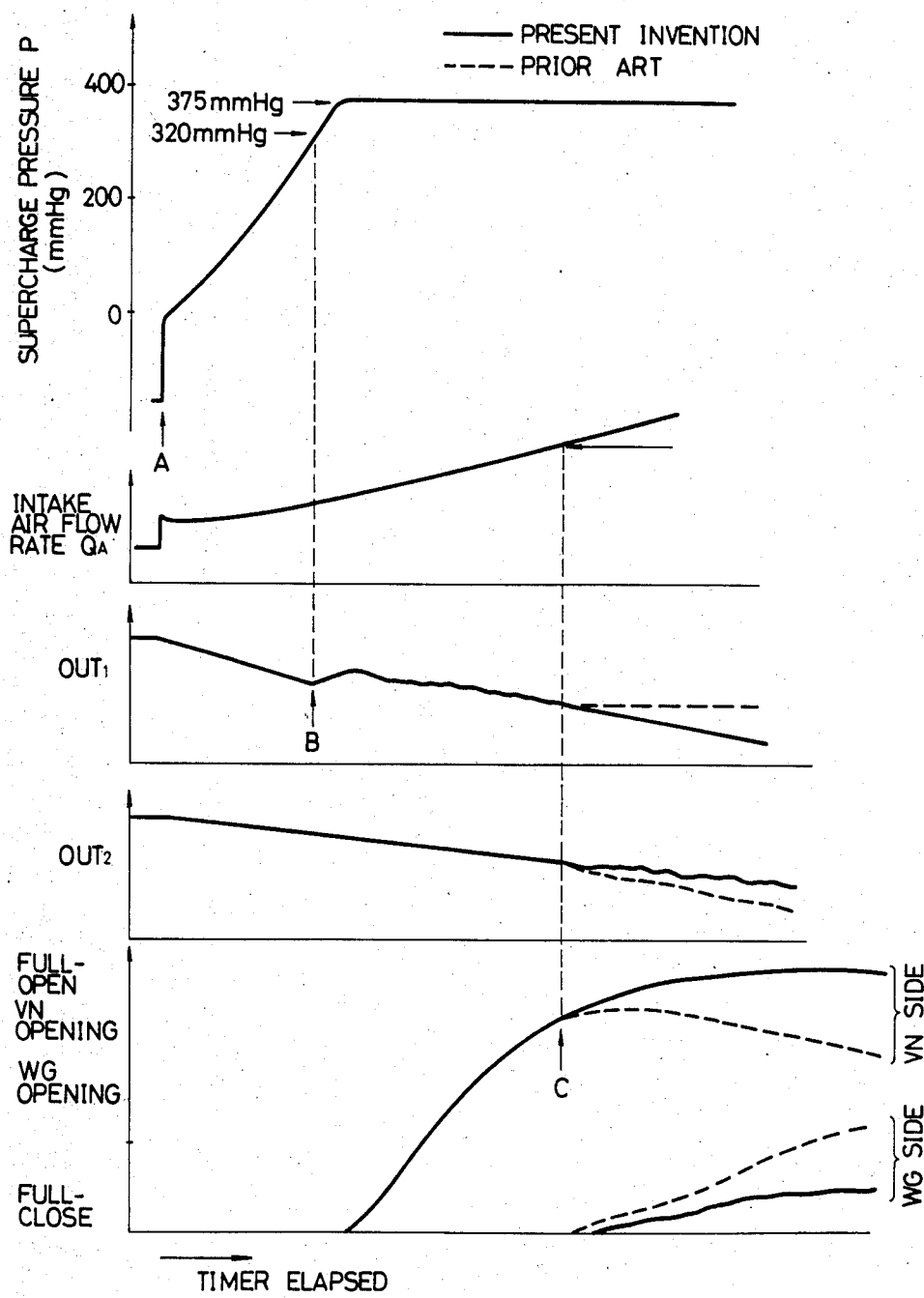

METHOD OF AND APPARATUS FOR CONTROLLING SUPERCHARGE PRESSURE FOR A TURBOCHARGER

BACKGROUND OF THE INVENTION

(1) Field of the Invention

The present invention relates to a method of and an apparatus for controlling supercharge pressure for a turbocharger.

(2) Description of the Prior Art

A turbocharger is constructed in such a manner that an exhaust gas turbine is rotated by exhaust gas at high temperature and at high pressure so that the pressure within the intake manifold can increased above atmospheric pressure as the number of rotations or rotational speed of a compressor in the turbocharger increases. As a result, the supply of a large quantity of intake air flow to the engine becomes possible by the supercharge pressure thus obtained, with the result that high torque, high output power and improvement of fuel consumption can be obtained.

Now, in a car engine having a wide range of engine speeds, it is common to provide the supercharge pressure in the middle and high speed operating zones. In the low speed operating zones, however, as it is difficult to obtain a sufficient exhaust pressure, and the torque at low speed will tend to be insufficient, to provide the supercharge pressure. In this case, it is known that the determinant of the supercharge pressure in the lower speed operating zone is the ratio A/R where A is the cross sectional area of a scroll and R is the radius from the center of the scroll. Accordingly, if the cross sectional area can be made small in the low speed operating zone having a small quantity of the exhaust gas flow, the supercharge pressure can be increased by increasing the rotational speed of the turbine.

To this end, a turbocharger of the variable capacity type which has capacity changing means, with the ratio A/R of the turbine being variable, has already been proposed by the same applicant of this application (see, for instance, Japanese Patent Application No. 58-162918) in which a sufficient supercharge pressure can be obtained even when the turbocharger of the variable capacity type is operated in the low speed operating zone.

In the supercharge pressure control using the turbocharger described above, the provision is made for an actuator for driving the capacity changing means of the turbocharger, with the supercharge pressure being at work pressure or operation pressure which is produced downstream of the compressor and actual supercharge pressure is controlled at a target or preset supercharge pressure, i.e., the ratio A/R of the turbine is controlled so as to rapidly increase the actual supercharge pressure by controlling the duty value of an electromagnetic valve which discharges the operating pressure to outside.

In the control characteristic of an electromagnetic valve, where the X-axis indicates intake air flow rate and the Y-axis indicates a basic control duty value (see, for instance, FIG. 9(A)), the duty value signifies the opening time of the valve per a predetermined time. When the duty value is 100 percent it indicates that it is fully opened and the cross-sectional area A is made minimum in this case by means of the actuator and the capacity changing means, so as to increase the rotational speed of the exhaust gas turbine.

On the other hand, when the duty value is zero, it indicates that the electromagnetic valve is fully closed, with the result that the sectional area A is made maximum and the rotational speed of the turbine is suppressed, thus controlling the supercharge pressure to be rapidly increased and afterwards to be maintained constant. In the actual control, in this case, in order to overcome the deviation of control involving different dispersion factors, it is common practice to perform a feedback control in response to an actually detected value. In this example as well, the amount of the feedback correction is calculated from the deviation between actual supercharge pressure and a target or preset supercharge pressure, and the duty value is corrected by this amount.

The capacity changing means of the type described above is provided for the purpose of securing a sufficient supercharge pressure from the low speed and low load operating zone of the engine. In the high load operating zone, however, the rotational speed of the turbine becomes excessively high to control the supercharge pressure. Accordingly, it is a common practice to provide an exhaust bypass valve for bypassing the discharge pressure at a turbine inlet to the turbine downstream. However, the provision of such a plurality of control means for controlling the supercharge pressure as described will possibly result in unexpected disadvantages as a result of the interference of the two kinds of control. Namely, the capacity changing means and the exhaust bypass valve are both control means for the supercharge pressure so that the action of one means affects the other. For instance, when the capacity changing means deviates in the direction of closure, i.e., in the direction of increase of the supercharge pressure from an optimum value, the exhaust bypass valve will deviate in the direction of opening, i.e., in the direction of suppressing the supercharge pressure from the optimum value and the supercharge pressure is maintained at a preset value as a whole.

In this manner as described above, in order to achieve the purpose of maintaining the supercharge pressure at the preset value, there will be numerous approaches to realize the control of the capacity changing means and the exhaust bypass valve. However, in order to maintain the engine performance at its maximum, it is necessary that the control is switched in an optimum position as the capacity changing means and the exhaust bypass valve have an optimum position respectively, while maintaining the supercharge pressure at the predetermined value.

To this end, the operating zones for controlling the capacity changing means and the exhaust bypass valve may be set up without overlapping and a control may be changed-over from the capacity changing means or the movable tongue member to the exhaust bypass valve at a maximum capacity condition of the capacity changing means in accordance with the result of a decision for the operating zones.

However, when changing-over the control, in spite of the condition that the capacity changing means is set at the optimum position so that a maximum capacity thereof may be obtained, the movable tongue member, as the capacity changing means, is moved in the direction of closure of the guide path for the exhaust gas when the exhaust gas flow is increased after switching over the control. As a result, the capacity of the turbocharger tends to be lowered.

Namely, in FIG. 3, the movable tongue member 45 is normally mounted at the confluence of the end 41 of a scroll 39 and a guide path 40 to the scroll surrounding an exhaust gas turbine 37, which is gradually reduced toward downstream in the direction indicated by the arrow F.

With this structure, when the flow speed of the exhaust gas is increased, the flow speed of the gas in the guide path 40 is also increased, and this results in the pressure lowering in the exhaust gas. Consequently, the movable tongue member 45 is pulled in the direction of closure, i.e., to the left in FIG. 3, by the lowering of the pressure. As a result, the capacity of the turbocharger is increased, which also results in the lowering in the acceleration performance.

SUMMARY OF THE INVENTION

It is therefore an object of the present invention to provide a method of and an apparatus for controlling supercharge pressure for a turbocharger in which the lowering in the capacity of the turbocharger can be prevented in the supercharge pressure control zone by the exhaust bypass valve after the supercharge pressure control is changed-over from the capacity changing valve to the exhaust bypass valve.

It is another object of the present invention to provide a method of and an apparatus for controlling supercharge pressure in which provision is made for means which controls the control amount of the capacity changing means so as to gradually increase the capacity of the exhaust gas turbine after the control is switched-over from the capacity changing means to the exhaust bypass valve means.

It is still another object of the present invention to provide a method and an apparatus for controlling supercharge pressure in which an exhaust gas guide path of the exhaust gas turbine is gradually opened by a capacity changing means after passing by a certain point of intake air flow rate, a sufficient exhaust gas flow can be secured even after entering a feedback control by the exhaust bypass valve means.

It is still further object of the present invention to provide a method and an apparatus for controlling supercharge pressure in which maximum performance of the turbocharger can be demonstrated and acceleration performance of the engine can be improved.

One feature of the present invention resides in a method of controlling supercharge pressure for a turbocharger, which comprises the steps of: detecting an accelerated condition from operating conditions of the engine; performing a feedback control by a capacity changing means when actual supercharge pressure reaches a target supercharge pressure value; controlling a duty value for a first electromagnetic valve for controlling said capacity changing means either by decreasing said duty value or by increasing the duty value in accordance with the conditions that the actual supercharge pressure exceeded the target value or if it is still below the target value so as to achieve agreement between the two values; decreasing the control duty value for the first electromagnetic valve after the feedback control was switched-over from the capacity changing means to an exhaust bypass valve when intake air flow rate reaches a predetermined value; and gradually increasing the exhaust gas guide path of the exhaust gas turbine by means of said capacity changing means, thereby securing a sufficient exhaust gas flow for the turbocharger.

Another feature of the present invention resides in a supercharge control apparatus for a turbocharger, which comprises: a plurality of detecting mans for detecting operating conditions of the engine, such as intake air flow, supercharge pressure; capacity changing means provided at a guide path of an exhaust pipe and having a shaft member coupled through an arm and rod means to a first actuator; an exhaust bypass valve provided at an exhaust manifold and having linkage means including another arm and rod means coupled to a second actuator; a first electromagnetic valve provided at a first liaison pipe for controlling said first actuator in accordance with a first control signal having a first control duty; a second electromagnetic valve provided at a second liaison pipe for controlling said second actuator in accordance with a second control signal having a second control duty; and an electronic control unit having a plurality of timers, and a microprocessor including a CPU, a ROM, and a RAM for producing said first and second control signals and for selectively controlling said first and second electromagnetic valves in accordance with parameters representative of the operating conditions of the engine.

These and other objects, features, and advantages of the present invention will be better understood from the following detailed description of the invention with referent to the accompanying drawings.

BRIEF DESCRIPTION OF THE INVENTION

FIG. 1 is a block diagram showing the basic concept of the construction of the apparatus for controlling supercharge pressure for a turbocharger, according to the present invention, FIG. 2 is an overall engine system having a turbocharger to which the method and apparatus according to the present invention have been applied, FIG. 3 is an enlarged cross-sectional view of a scroll portion of a turbocharger of FIG. 2, FIGS. 4(A), 4(B), and 4(C) illustrate a control flow chart for controlling the capacity changing means and the exhaust bypass valve means and a control flow chart for performing an over-boost control through the electronic control unit shown in FIG. 2, according to the present invention, FIGS. 5(A), 5(B), and 5(C) are detailed control flow charts of the feedback control performed in step 211 in FIG. 4(A), according to the present invention, FIGS. 6(A) and (B) are control flow charts for carrying out an acceleration decision according to the present invention, FIG. 7 is a control flow chart for performing a learning control for the capacity changing means or movable tongue member, according to the present invention, FIG. 8 is a control flow chart for performing a learning control for the exhaust bypass valve, according to the present invention, FIGS. 9(A), (B) and (C) illustrate the characteristics of basic control duty vs. intake air flow for the capacity changing means and exhaust bypass valve and part of a look-up table for the capacity changing means, stored in the ROM of the microprocessor in the electronic control unit in FIG. 2, respectively, FIG. 10(A) is the characteristic curve of intake air flow rate vs. target supercharge pressure to be used in the present invention, FIG. 10(B) is the characteristic curve of engine cooling water temperature vs. decrement in the control amount due to the over-boost control to be used in the present invention, FIG. 11 is the characteristic graph of the reduction in the control duty vs. supercharge pressure, to be used in the present invention, FIG. 12(A) illustrates an accelerated time period during which the actual supercharge pressure is increased from 100 mmH to 200 mmHg, FIG. 12(B) illustrates experimental values of engine speed vs. acceleration time for explaining a sudden acceleration utilizing the decision line, FIG. 13 is the characteristics of the proportional portion vs. the deviation of the supercharge pressure, FIG. 14 illustrates the control zones due to the capacity changing means and the exhaust bypass valve, according to the present invention, FIG. 15 shows an overshoot condition of the actual supercharge pressure with the time elapsed, FIG. 16 is the characteristic curve of supercharge pressure for explaining a decision error for an suddenly accelerated condition, and FIG. 17 illustrates one embodiment of the feedback control to the capacity changing means and exhaust bypass valve means according to the present invention.

DESCRIPTION OF PREFERRED EMBODIMENTS

Figure 1:
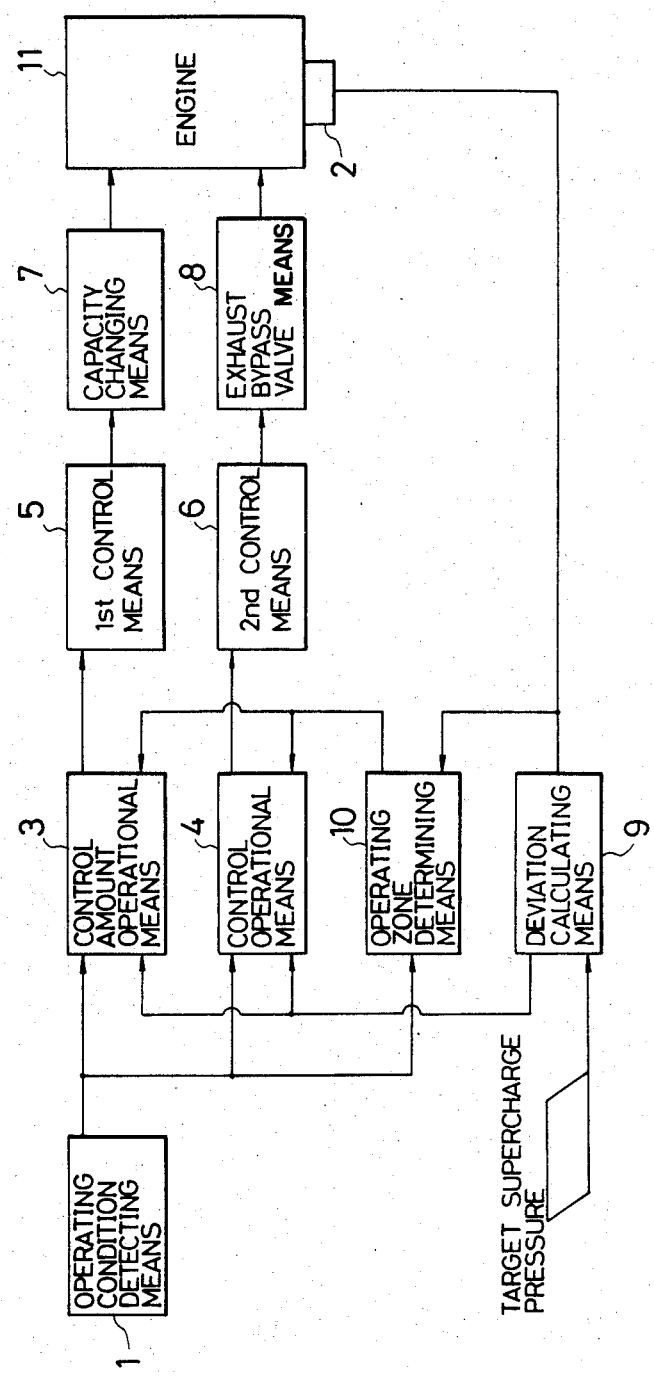

Referring to FIG. 1, a basic conception of the construction of the apparatus for controlling supercharge pressure for a turbocharger, according to the present invention is shown. The apparatus comprises operating condition detecting means 1, supercharge pressure detecting means 2, first control amount operational means 3, second control amount operational means 4, first control means 5, second control means 6, capacity changing means 7, exhaust bypass valve means 8, deviation calculating means 9, operation zone determining means 10, and an engine 11.

The operating condition detecting means 1 detects the operating conditions of the engine 11, for instance, it detects intake air flow rate as one parameter representative of the operating conditions. The supercharge pressure detecting means 2 detects the actual supercharge pressure to be pressurized in a compressor not shown. The deviation calculating means 9 calculates the deviation between the actual supercharge pressure detected and a target or preset supercharge pressure.

A plurality of control loops for controlling the supercharge pressure consists of a control loop for controlling the exhaust gas flow to an exhaust gas turbine not shown, which is varied by the capacity changing means 7 capable of changing the ratio A/R of the turbine and another control loop for controlling the same through the exhaust bypass valve means 8. Namely, the first and the second control amount operational means 3 and 4 calculate the control amount of the capacity changing means 7 and of the exhaust bypass valve means 8 for the turbine, respectively, in accordance with parameters representative of the operating conditions of the engine including at least integral values of the deviation. The first and the second control means 5 and 6 control the capacity changing means 7 and the exhaust bypass valve means 8 in accordance with the control amounts calculated in the first and the second control amount operational means 3 and 4. With the plural control means for performing respective feedback control in accordance with the deviation, the actual supercharge pressure is controlled to the preset supercharge pressure.

The operation zone determining means 10 determines one operation zone to be feedback-controlled from another, e.g., it determines a predetermined operation zone in accordance with the intake air flow rate and the supercharge pressure detected by the supercharge pressure detecting means 2 and it permits the calculation of the control amount responsive to the deviation to be carried out selectively through either one of the first or the second control amount operational means 3 or 4, in accordance with the result of the determination.

In the present invention, the provision is made for means which controls the control amount of the capacity changing means 7 so as to gradually increase the capacity of the turbine, after the control is switched-over from the capacity changing means 7 to the exhaust bypass valve 8. The control amount operational means 3 may be provided with the control means integrally or the means may be provided independently.

With this construction, after switching the control to the exhaust bypass valve, the movable tongue member or capacity changing means can be gradually moved in the direction of closure of the guide path even when the exhaust gas flow is increased, and the turbine can be controlled in the direction of a gradual increase in the capacity of the turbine, thus enabling the exhaust gas flow into the turbine to be sufficiently secured as well as obtaining maximum turbocharger performance.

Figure 2:
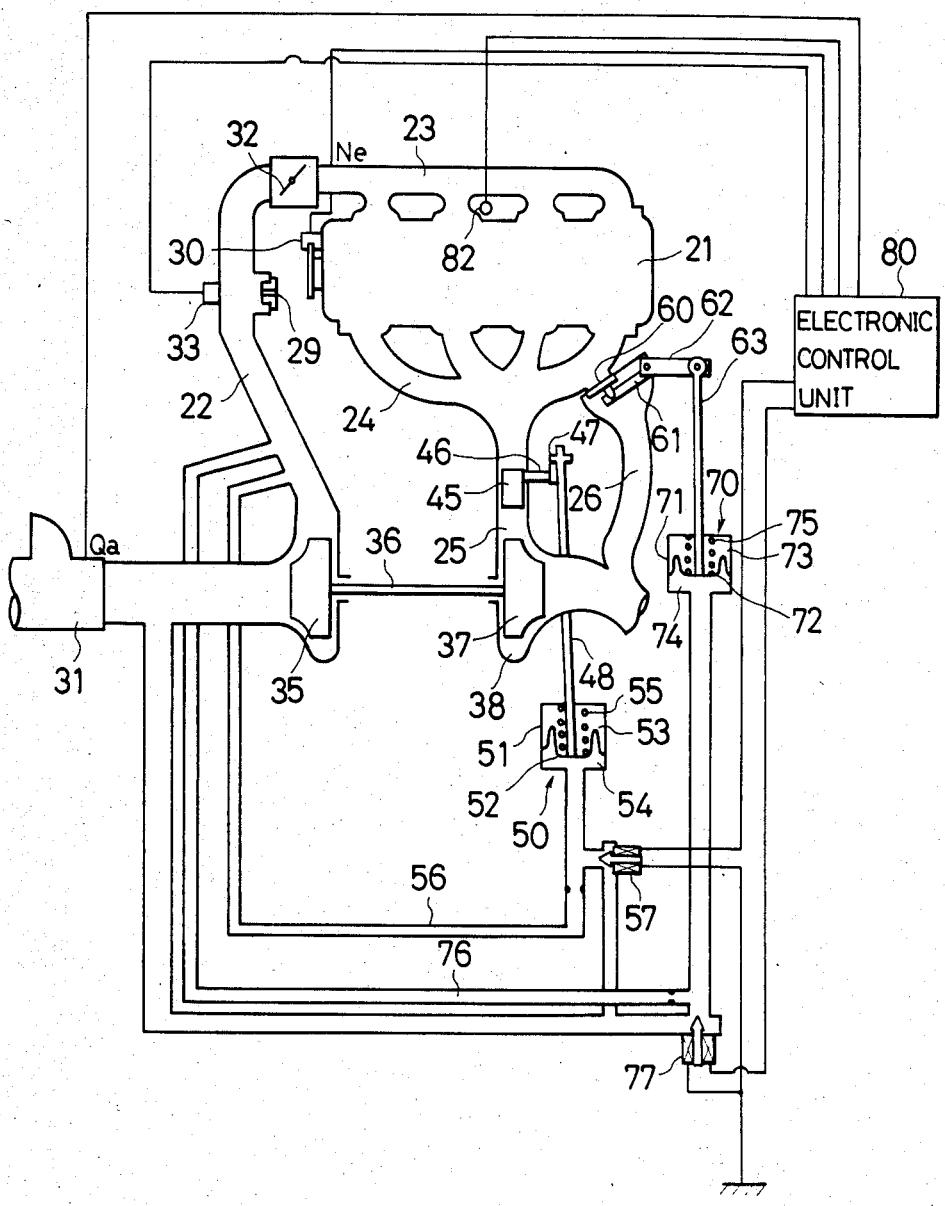

FIG. 2 shows an overall engine system having a turbocharger to which the present invention is applied. In the engine system, air is supplied to an engine 21 through an inlet pipe 22 and an inlet manifold 23, and exhaust gas is discharged through an outlet manifold 24 and an exhaust pipe 25.

At the left end of the inlet pipe 22, there is provided an air flow meter 31 for measuring the inlet air flow rate $Q_A$ and at the opposite side of the inlet pipe 22, there is provided a compressor 35 which constitutes part of the turbocharger, which supplied the intake air supplied through the air flow meter 31 to the engine 21 after pressurizing the air.

Figure 3:
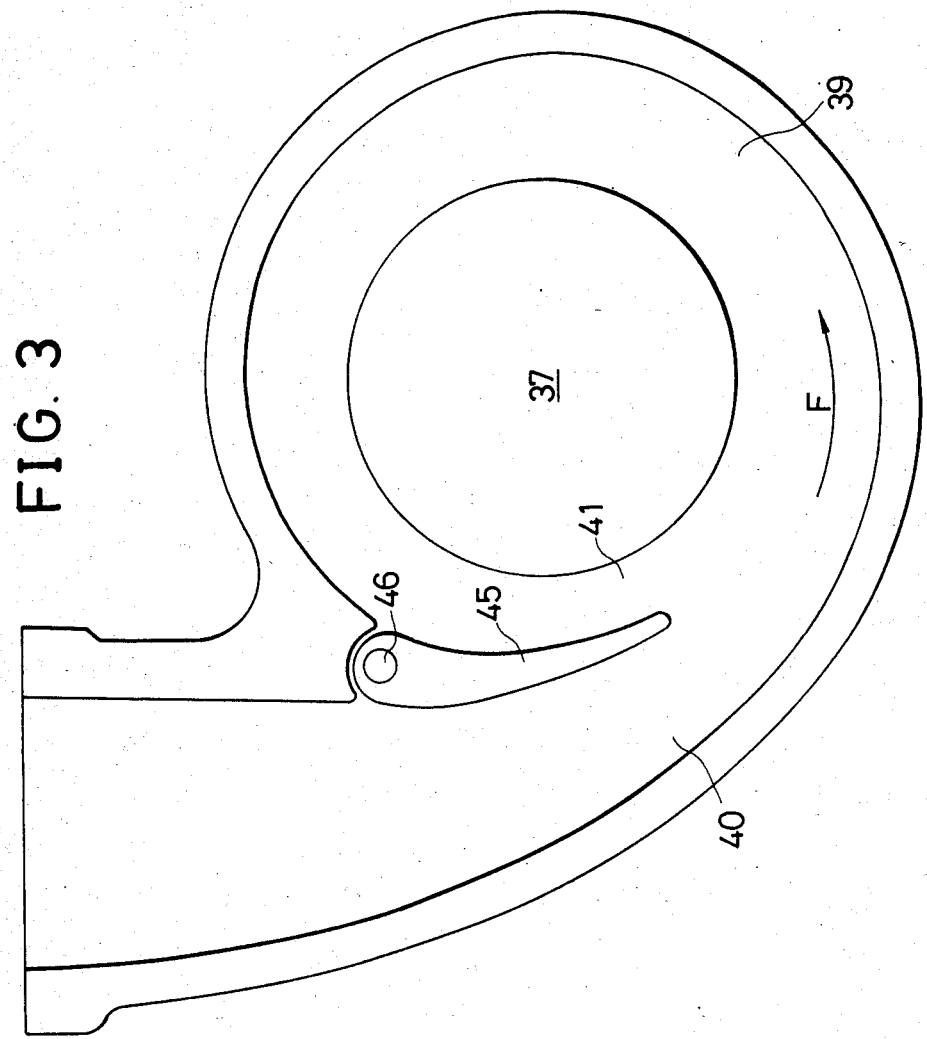
Figure 4:
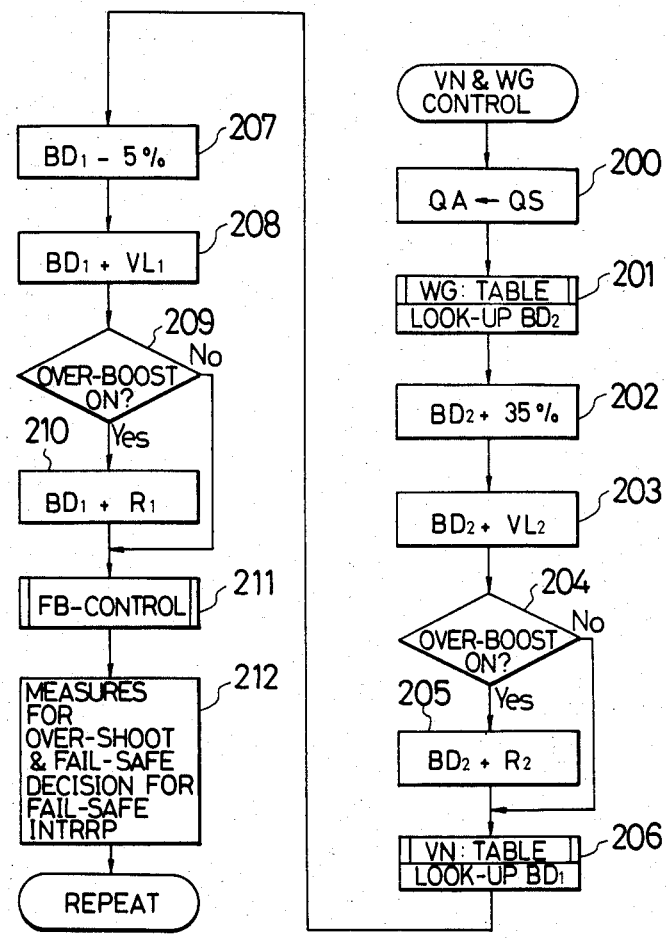
Figure 4:
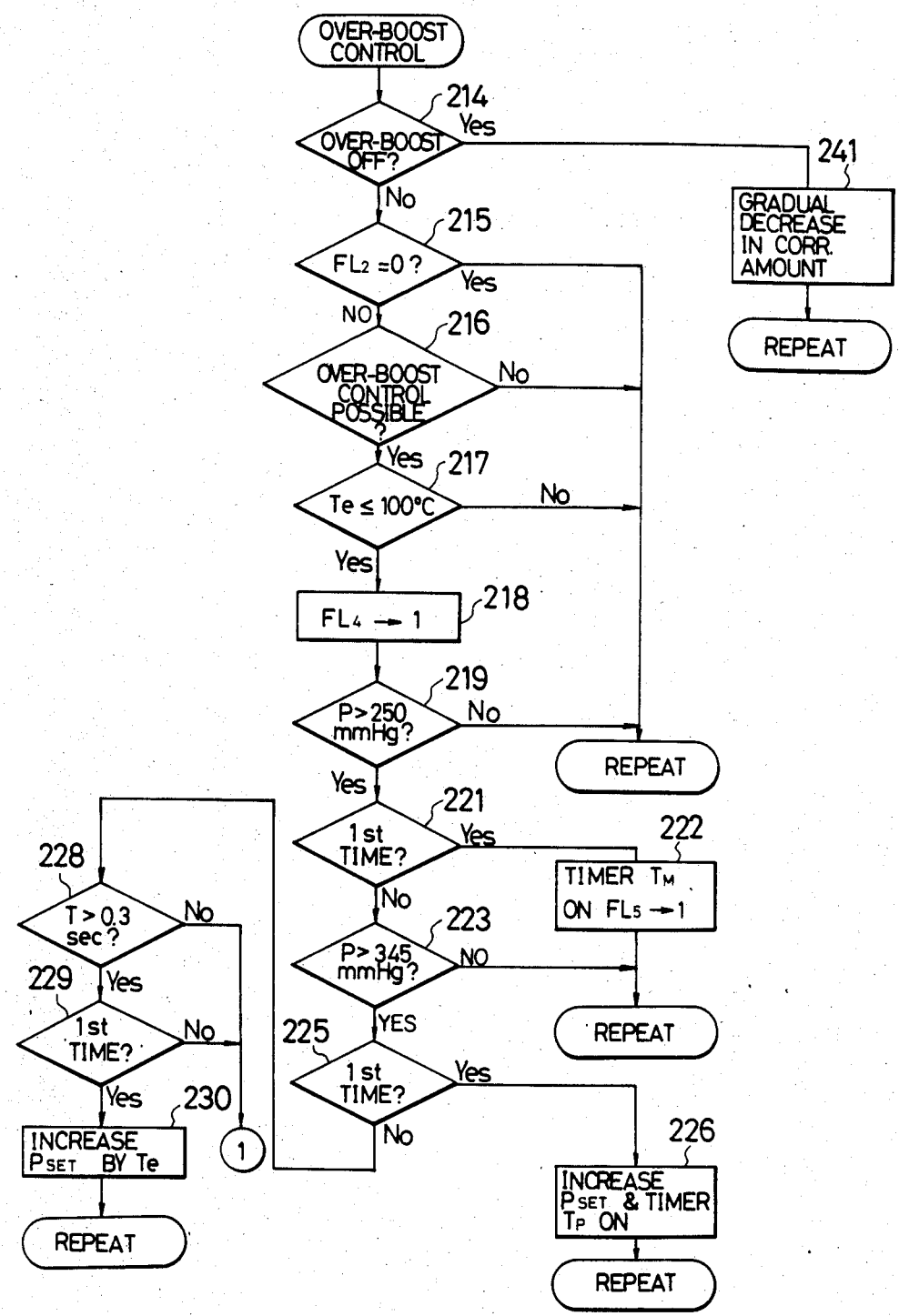
Figure 4:
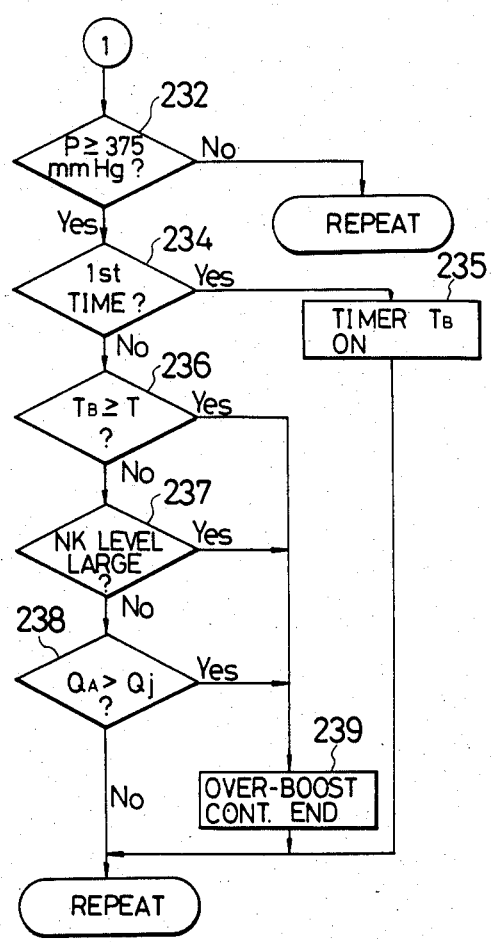

At the base end portion of the inlet pipe 22 adjacent to the intake manifold 25, there is provided an throttle valve 32 while a drain valve 29 is provided between the compressor 35 and the throttle valve 32. A turbine chamber 38 is formed at the bottom of the exhaust pipe 25 and a turbine 37 is provided within the turbine chamber 38, which is linked with the compressor 35 by a link shaft 36. The turbine chamber 38 is provided with a scroll 39 surrounding the turbine 37, as shown in FIG. 3. The scroll 39 is formed in such a manner that the cross-sectional area thereof is gradually reduced in a down stream direction from a guide path 40 as shown by the arrow F.

At the confluence of the guide path 40 to the scroll 39 and the terminal end 41 of the scroll 39, there is provided a movable tongue or flap valve member 45 as a capacity changing means. The movable tongue member 45 is pivotally supported by a shaft 46 so as to adjust the cross-sectional area of the guide path 40. The movable tongue member 45 is provided within the exhaust pipe 25 in the figure near upstream of the guide path 40 in the turbine 37. The shaft 46 pivotally supporting the movable tongue member 45 is linked to the upper end of a rod 48 through an arm 47 and the lower end of the rod 48 is linked to a diaphragm 52 which constitutes an actuator 50 for driving the movable tongue member 45.

A housing 51 having the diaphragm 52 is divided by the diaphragm 52 into an atmospheric chamber 53 and a positive pressure chamber 54. The atmospheric chamber 53 is provided with a spring 55 which is urged so as to push the diaphragm 52 toward the positive pressure chamber 54. The positive pressure chamber 54 is communicated with the inlet pipe 22 located downstream of the compressor 35 through a liaison pipe 56, so that the supercharge pressure produced by the compressor 35 is supplied to the positive pressure chamber 54, and it pushes the diaphragm 52 to the atmospheric chamber 53 against the spring 55.

Moreover, an electromagnetic valve 57 is provided between the inlet pipe 22 and the liaison pipe 56, which is, when operated, to be opened by a control signal from an electronic control unit 80, and the liaison pipe 56 is communicated with the atmosphere through the electromagnetic valve 57. As a result, the pressure within the positive pressure chamber 56 is lowered. Specifically, since the duty-cycle of the electromagnetic valve 57 is controlled by the electronic control unit 80 in such a manner that the larger the duty cycle valve, the more the degree of opening of the electromagnetic valve 57 increases, thus lowering the pressure in the positive pressure chamber 54. Accordingly, the diaphragm 52 is moved downward by the action of the spring 55 in the atmospheric chamber 53 and this movement is transmitted to the movable tongue member 45 through the rod 48, the arm 47 and the shaft 46, thus permitting the movable tongue member 45 to be pivoted in the direction of reducing the guide path 40 for the exhaust gas to the turbine 37, i.e., in the direction of closing the guide path 40. As a result, the flow speed of the exhaust gas to be supplied to the turbine 37 increases and the supercharge pressure of the compressor 35 to the engine 21 also increases.

On the other hand, the smaller the duty value becomes, the more the degree of opening of the electromagnetic valve 57 decreases and in turn the pressure in the positive pressure chamber 54 increases and then the diaphragm 52 is moved upward against the force of the spring 55, thus permitting the movable tongue member 45 to make a pivotal movement in the direction of opening the guide path 40. As a result, the flow speed of the exhaust gas to be supplied to the turbine 37 decreases and the supercharge pressure by the compressor 35 to the engine 21 also lowers.

An exhaust bypass valve 60 is provided at the junction between an exhaust bypass path 26 for bypassing the turbine 37 and the exhaust manifold 24. The exhaust bypass valve 60 is linked to one end of a rod 63 through an arm 61 and a linkage member 62, and the other end of the rod 63 is linked to a diaphragm 72 in an actuator 70 so as to drive the bypass valve 60. A casing 71 having the diaphragm 72 is divided into an atmospheric chamber 73 and a positive pressure chamber 74 by the diaphragm 72. The atmospheric chamber 73 is provided with a spring 75 which is urged so as to push the diaphragm 72 toward the positive pressure chamber 74. The positive pressure chamber 74 is communicated with the inlet pipe 22 at downstream of the compressor 35 through a liaison pipe 76 and the supercharge pressure produced by the compressor 35 is supplied to the positive pressure chamber 74.

Another electromagnetic valve 77 is provided at a liaison pipe 76 and when the electromagnetic valve 77 is opened by a control signal from the control unit 80, the liaison pipe 76 is communicated with the atmosphere through the electromagnetic valve 77, thus lowering the pressure within the positive pressure chamber 74. More specifically, the duty cycle of the electromagnetic valve 77 is controlled by the electronic control unit 80, so that the larger the duty valve thereof becomes, the more the degree of opening of the electromagnetic valve 77 increases. As a result, the pressure in the positive pressure chamber 74 lowers and the diaphragm 72 is moved downward by the action of the spring 75 within the atmospheric chamber 73. This downward movement of the diaphragm 72 is transmitted to the exhaust bypass valve 60 through the rod 63, the linkage member 62, and the arm 61 and the valve 60 is operated in the direction of closing the bypass path 26.

On the other hand, the smaller the duty valve becomes, the smaller the degree of opening of the electromagnetic valve 77 becomes so that the pressure in the positive pressure chamber 74 increases. As a result, the diaphragm 72 is moved upward against the spring 75 and the upward movement of the diaphragm permits the exhaust bypass valve 60 to be operated in the direction of opening. The function of the valve 60 is to prevent the engine 21 from being damaged due to the excessive increase in the intake supercharge pressure to be supplied to the engine 21 when the engine 21 operates in a high speed, high load condition. To this end, part of the exhaust gas from the engine 21 is discharged to outside and a suitable supercharge pressure is introduced into the engine 21 by reducing the exhaust gas to be supplied to the turbine 37.

The electronic control unit 80 comprises a microprocessor including a central processing unit (CPU), a random access memory (RAM), and a read-only memory (ROM), different timers $T_A$, $T_B$, $T_L$, $T_P$ and $T_M$, an A/D converter, and an input/output interface (all are not shown). The detected signals from the air flow meter 31, the crankangle sensor 30, water temperature sensor 82, and the supercharge pressure sensor 33 are applied to the control unit 80 and they are converted into digital data corresponding to the intake air flow rate $Q_A$, the engine speed Ne, the water temperature Th, and the actual supercharge pressure P through the A/D converter in the control unit in the well-known manner.

The microprocessor, not shown, in the control unit 80 calculates suitable duty values of control signals to be applied to the electromagnetic valve 57 and 77 for driving the same, in accordance with the detected signals. As the result of controlling the electromagnetic valves 57 and 77, the exhaust bypass valve 60 is controlled and the cross-sectional area of the guide path 40 for the exhaust gas to the turbine 37 can be changed, while the amount of the exhaust gas to the turbine 37 is changed by the control of the exhaust bypass valve 60. By these actions, the intake supercharge pressure to be supplied to the engine 21 is suitably controlled in response to the intake air flow rate $Q_A$, thus increasing the torque from the low speed operating zone to the high speed operating zone.

FIGS. 4(A) to 8 show control flow charts for controlling the movable tongue member 45 as a capacity changing means 7 and the exhaust bypass valve 60 through the electronic control unit 80 (see, FIG. 2) having the microprocessor. In these figures, the movable tongue member 45 is indicated by VN and the exhaust bypass valve 60 indicated by WG.

As is well-known, in the art, various data such as target or preset engine speed, preset supercharge pressure, preset intake air flow rate are stored in the ROM, while detected data concerning the operating conditions of the engine such as actual engine speed, actual supercharge pressure, actual intake air flow rate, are normally stored in the RAM temporarily.

In FIG. 4(A), operations and calculations for the supercharge pressure control by VN and WG are performed at each predetermined control time period, so as to achieve agreement between the preset supercharge pressure P Set and the actual supercharge pressure P in accordance with the operating conditions of the engine.

After starting the operation, air flow index $Q_S$ is sought from intake air flow rate $Q_A$ in step 200. In the actual control, this air flow index $Q_S$ is used as data for calculations. However, in the following explanation, $Q_S$ is used as the intake air flow rate $Q_A$.

In step 201, a basic control duty (duty cycle) $BD_2$ for WG is read from a lock-up table and a value of 35% of the basic control duty value is added to the basic control duty $BD_2$ in step 202. This value is selected for the purpose of correcting the control amount due to a deviation. This value of 35% is a correction amount $R_2$ for the basic control amount so as to prevent an erroneous opening of WG from occurring due to dispersions of a setting value for WG and of parts of the system.

In step 203, a learning amount $VL_2$ obtained from a learning control is added to the basic control duty $BD_2$ in step 203 so as to cancel a constant deviation which occurs in the feedback control system.

In step 204 a decision is made if an over-boost control is performed so as to improve acceleration performance by temporarily increasing the supercharge pressure P during a sudden accelerated condition. If the result of the decision in step 204 is YES, that is the over-boost control is performed, the operation now moves to the step 205, where the acceleration correction amount $R_2$ for the over-boost control is added to the basic control duty $BD_2$. The learning amount $VL_2$ and the acceleration correction amount $R_2$ are the ones for imparting a feedforward control amount for WG. The calculation of the learning amount $VL_2$ and the over-boost control will be described later.

In steps 206 to 210, the feedforward control amount for VN is sought from a look-up table as a basic control duty (duty cycle) $BD_1$. The steps 201 to 205 are almost the same as the steps 206 to 210, except for the subtraction of 5 percent for the basic control duty $BD_1$ sought from the look-up table in step 207. This subtraction of 5 percent is a correction amount $R_1$ for preventing WG from being opened when VN is displaced in the direction of closure due to any displacement or shifting of the basic control duty of VN and the dispersions of parts used.

In step 208, a learning amount $VL_1$ is added to the basic control amount $BD_1$, similar to the WG side. The calculation of the learning amount $VL_1$ will be explained later.

Since each characteristic of the basic control duties VN and WG is known, for instance, as shown in FIGS. 9(A) and 9(B), and the corresponding data have preliminarily been stored in the ROM as shown in FIG. 9(C), the basic control amounts $BD_1$, and $BD_2$ of VN and WG can be sought from a look-up table. FIG. 9(C) shows only the table look-up data for VN, in the form of Hexadecimal bits H.

In step 211, a feedback correction amount is calculated against the deviation of the actual supercharge pressure P from the target or preset supercharge pressure $P_{set}$ and then the feedback correction amount is further added to the feedforward control amount previously obtained, so as to calculate each of the final control amounts $OUT_1$ and $OUT_2$ of the control signals from the $BD_1$ and $BD_2$. This feedback control about the actual supercharge pressure P to be carried out in step 211 will be explained later.

In step 212, a processing for prevention of an overshoot phenomena in the initial period of the sudden accelerated condition and a fail-safe operation at the time of failure in the constructing parts, are carried out.

Figure 15:
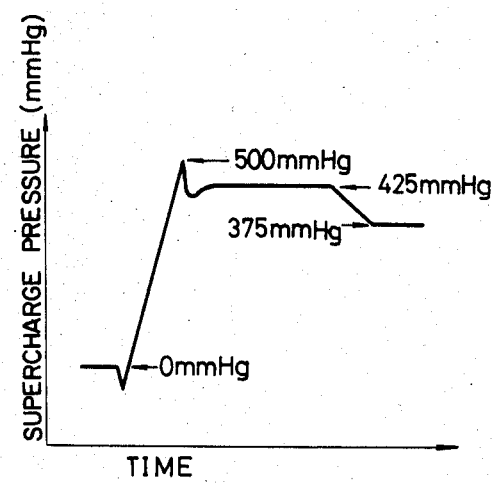

Namely, the supercharged pressure is abruptly increased when the vehicle is suddenly accelerated. However, since the increase in the supercharge pressure is fast in the turbocharger having VN, as compared with a normal turbocharger, an overshoot is produced as shown in FIG. 15. In the example shown in FIG. 15, the supercharge pressure often tends to go beyond 500 mm Hg during the overboost control, which would result in damage to the engine. In order to prevent this, the duty of the control signal for WG is temporarily reduced in the initial period of the suddenly accelerated condition, increasing the exhaust gas bypassing of the turbine 37, so as to increase the exhaust gas flow to be drained, thus lowering the supercharge pressure.

More specifically, the duty correction for controlling WG can be carried out by the supercharge pressure as shown in FIG. 11, as follows. When the actual supercharge pressure P is increased due to the sudden acceleration, the control duty for WG is reduced by 50 percent at a time point where the actual supercharge pressure P exceeded a predetermined supercharge pressure $P_{set}=P_o$. In this case, however, if the predetermined supercharge pressure $P_{set}=P_o$ is set up at a small value, e.g., at 375 mm Hg in order to prevent the overshoot from occuring, the actual supercharge pressure is lowered afterwards. Accordingly, it is preferable to reduce the control duty at about 0.3 seconds after the actual supercharge pressure reaches the predetermined supercharge pressure $P_o$.

After the elapse of 0.3 seconds, the normal fail-safe operation is performed so as to correct the control duty for WG by gradually reducing the actual supercharge pressure from $P_1$ to $P_3(>P_0)$ stepwise.

By taking into consideration of the exhaust gas valve WG not being opened, a fail-safe release request flag $FL_3$ is set so as to release the fail-safe operation in the engine control system when the actual supercharge pressure remaining exceeds the $P_4$ point.

The control duties for WG and VN thus finally obtained are stored in the RAM and then produced from the electronic control unit 80 for supplying to each of the electromagnetic valves 77 and 57, as control signals. When the overshoot prevention or fail-safe operation is needed, the control signal $OUT_1$ and $OUT_2$ are corrected by their associated factors, respectively.

Figure 5:
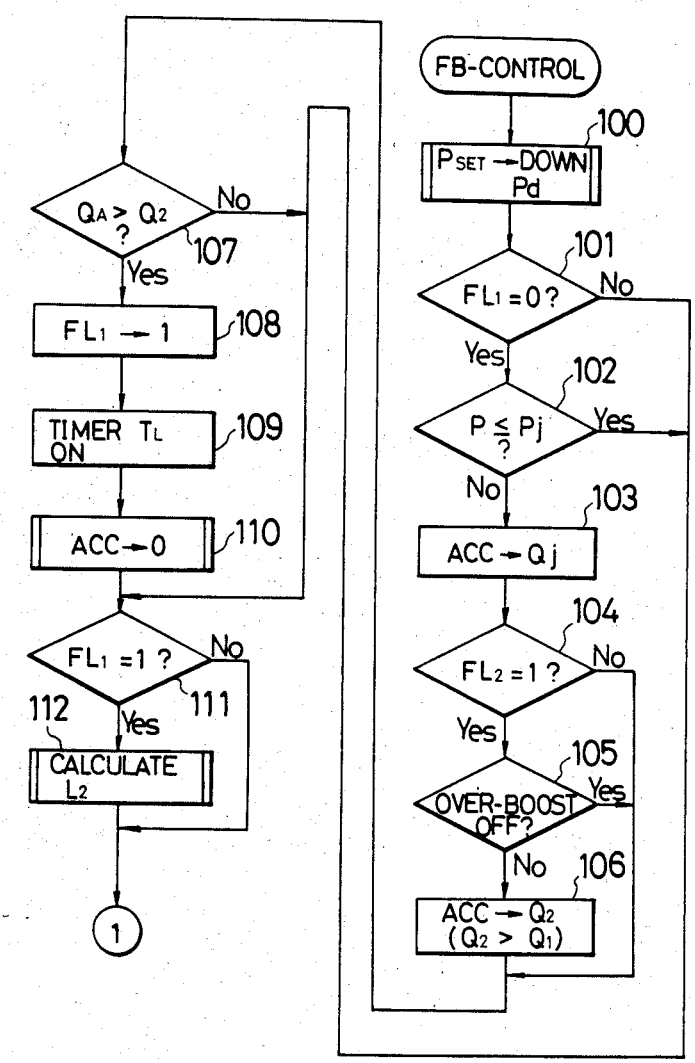
Figure 5:
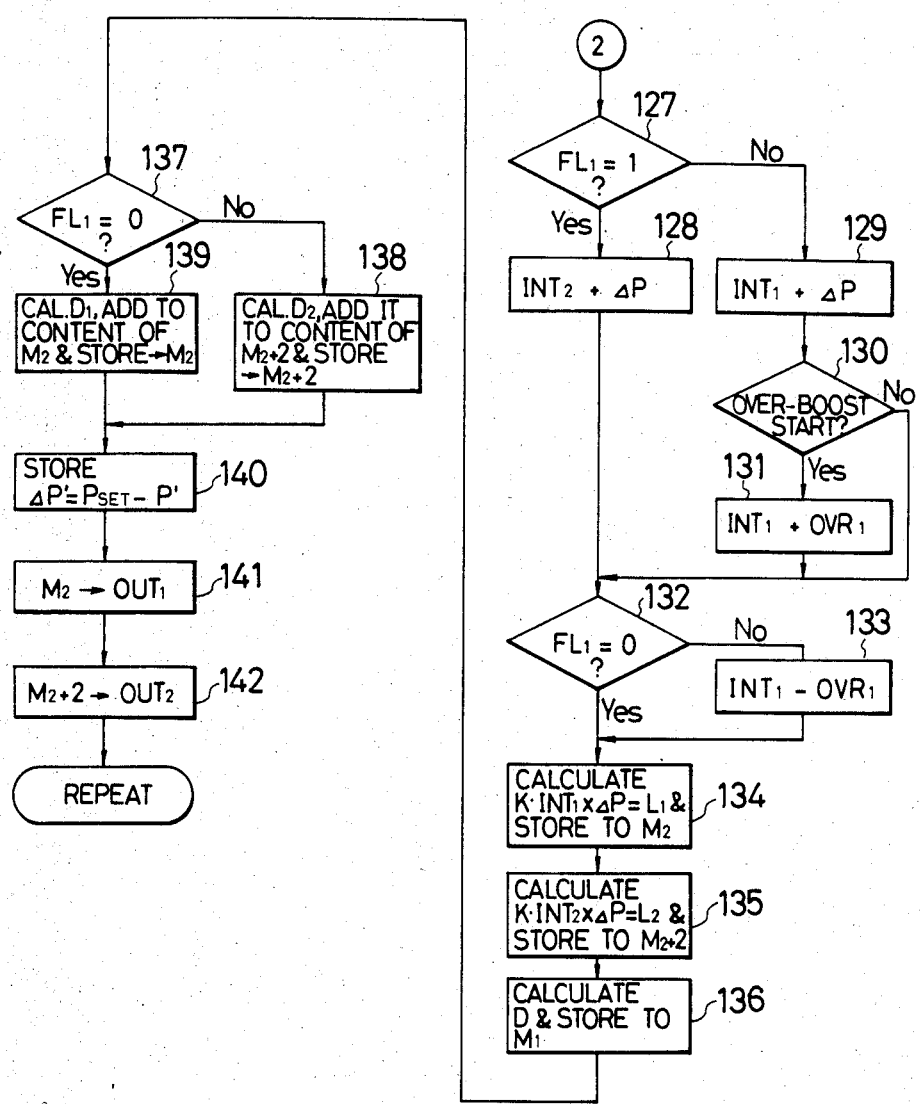

Its detailed explanation will now be made for the feedback control FB-CONTROL to be carried out in step 211, with reference to a detailed control flow chart, shown in FIG. 5. In this step 211, various operations are performed such as, for instance, a decision is made in which of the operation zones, VN or WG, the feedback control should be performed, calculations of the feedback correction amounts and the learning amounts are carried out and the control amounts thus finally obtained are temporarily stored in the RAM.

In step 100, the target or preset supercharge pressure $P_{set}$ is lowered so as to avoid abnormal combustion when the intake air flow is increased. For instance, since the data corresponding to the characteristics in FIGS. 10(A) and 10(B) have preliminarily been stored in the ROM of the microprocessor, when the actual intake air flow rate $Q_A$ becomes above a predetermined or preset intake air flow rate $Q_{set}$, the preset value is gradually lowered.

In step 101, a decision is made in which of the control zones, VN or WG, the feedback control is being performed, from the control flag $FL_1$. If the result of the decision is $FL_1 = "1"$, i.e., the control flag $FL_1$ is "1", it means that the feedback control is being applied to WG, and the operation moves to step 111. However, if the result of the decision in step 101 is $FL_1 = "0"$, it means that the control is being applied to VN and the operation now moves to the steps starting from step 102, where another decision of the operation zones to be feedback controlled and other calculations of the learning amount, etc. are carried out.

Namely, in step 102, a decision is made if the actual supercharge pressure P is equal to or smaller than a decision supercharge pressure $P_j$, e.g., 230 mm Hg for determining the operation zone to be feedback-controlled. If the result of the decision if NO, i.e., $P > P_j$, the operation moves to step 111 without determining any operation zones to be controlled. This operation is done for preventing the feedback control from being switched to the WG side before entering the overboost control after the determination of the sudden accelerated condition of the vehicle which will be explained below.

That is, in the over-boost control, the decision for the sudden accelerated condition is made from the comparison of the accelerated time $\tau$ from change in the actual supercharge pressure from 100 mm Hg to 200 mm Hg, with a decision reference time $T_j$. If the result of the comparison is that the accelerated time $\tau$ is below the decision reference time $T_j$, it is considered as being in the sudden accelerated condition. In this case, the situation is similar to the case where a determination of the operation zone is made when the actual supercharge pressure P is below the preset supercharge pressure $P_{set}$ so as to try to carry out the operation zone determination.

However, in order to achieve this, it is required that the actual intake air flow rate $Q_A$ is compared with a predetermined decision intake air flow rate $Q_j$ for determining the feedback control zone, other than the determination for the sudden accelerated condition. Consequently, this would result in the condition that the feedback control is switched from the VN side to the WG side, regardless of the decision of the sudden accelerated condition of the vehicle, before the over-boost control is performed so as to increase the response when the sudden accelerated condition is detected. This occurs, because when the intake air flow becomes larger than the predetermined intake air flow $Q_j$ it is determined that the control is performed in the WG side control zone. As a result, it is no longer possible to perform the over-boost control. For the purpose of preventing this situation, when the actual supercharge pressure P is below the predetermned value of decision supercharge pressure $P_j$, no decision will be made for the operating zone.

In step 103, the preset or decision intake air flow $Q_j = Q_1$, for determining the feedback control zone to set at a register ACC of the microprocessor. The decision intake air flow $Q_1$ corresponds to the line $Q_1$ in FIG. 14. Namely in FIG. 14, the left side zone from the line $Q_1$ indicates the VN control zone while the right side zone from the line $Q_1$ indicates the WG control zone.

In step 104, a decision is made if a sudden accelerated condition exist. If the result of the decision is YES, the flag $FL_2$ is set at "1", and the operation goes to step 105 as it is in the suddenly accelerated condition. (A detailed explanation of the flag $FL_2$ for determining the suddenly accelerated condition will be made later.)

On the other hand, however, if the result of the decision is NO, the operation moves to step 107 as it is not in the suddenly accelerated condition.

In step 105, another decision is made if the overboost control is terminated. If the result of the decision is NO, that is the overboost control is being performed, the operation now moves to step 106. However, if the result of the decision is YES, i.e., the overboost control is terminated, the operation now moves to step 107.

In step 107, the actual intake air flow rate $Q_A$ is compared with a predetermined intake air flow $Q_j = Q_2$ stored in the register ACC for determining the operating zone. If the result of the determination is that the intake air flow rate $Q_A$ is larger than the predetermined air flow $Q_2$, the operation moves to the step 108 as the control is not being carried out in the VN zone.

In step 108, a decision is made if the flag $FL_1$ indicative of the control zones of either the VN side or WG side is set at "1". This indicates that the control which has been performed in the VN side control zone, with the flag $FL_1 = 1$, has now been switched to the WG zone and the operation now goes to step 109. In step 109, a timer $T_L$ for starting the learning control of the WG is operated and the operation moves to step 110, where the learning amount calculation for the VN is carried out. This learning amount calculation will be explained later.

Figure 14:
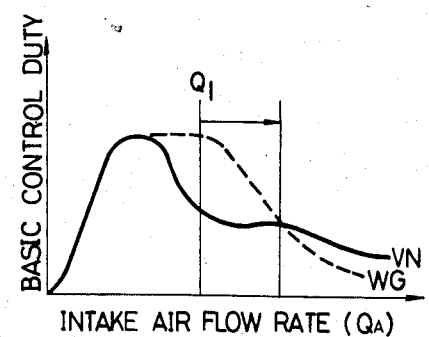

In step 111, the condition of the flag $FL_1$ is determined. If the result of the determination is $FL_1 = "0"$, the operation moves to step 113 (FIG. 5B). However, if the result of the determination is $FL_1 = "1"$, the operation now goes to step 112, where the learning amount calculation for WG is performed. In such a manner as described above, the determinations of operating zones to be feedback-controlled as shown in FIG. 14, as well as the learning amount calculations for either VN or WG are performed.

The operations after step 113, each feedback correction amount calculation for VN or WG is carried out. Here, proportional, integral and differential controls will be described, with the proportional portion, the integral portion, and differential portion which are calculated from a deviation being abbreviated as PROP portion, INT portion, and D portion, respectively.

In step 113, the $PROP_1$ portion for VN is firstly calculated and it is added to the basic control duty $BD_1$ previously obtained. The result of the addition is stored in a location M2 in the RAM. The calculation of the $PROP_1$ portion is carried out as follows, by taking into consideration the stability of the control and possible deviation of the basic control duty $BD_1$. Namely, the $PROP_1$ portion for VN is $K.PROP_1 \times \Delta P2$, where $K.PROP_1$ indicates operational gain and $\Delta P$ indicates the deviation between the actual supercharge pressure P and the preset supercharge pressure $P_{set}$, i.e., pressure $\Delta P = P_{set} - P$. After this calculation, the operation moves to step 114.

Figure 13:
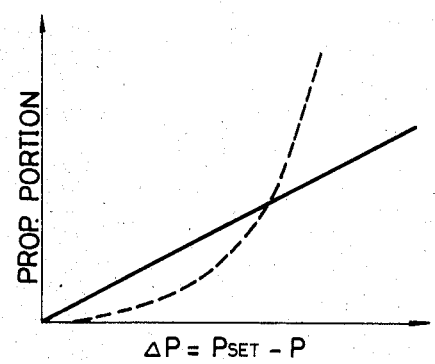

In step 114, the $PROP_2$ portion for WG is calculated and it is added to the basic control duty $BD_2$ previously obtained. The result of the calculation is stored in the memory location $M2+2$, in a similar manner to the calculation for the VN side. In this case, the $PROP_2$ portion for WG is indicated $K.PROP_2 \times \Delta P^2$, where $K.PROP_2$ indicates the operational gain for WG. In FIG. 13, the $PROP_1$ portion for VN is indicated by a dotted line, while the $PROP_2$ portion for WG is indicated by a solid line.

The PROP portion for either VN or WG thus obtained from the feedback control is always added to the basic control duty, respectively. However, as the integral and differential control is performed in the control zone above a predetermined supercharge pressure, in the following steps 115 to 118 a decision is made if the integral plus differential control should be performed.

Firstly, in step 115, the actual supercharge pressure P is stored in the register ACC and the operation moves to step 116, where a decision is made if the target supercharge pressure $P_{set}$ is set at 375 mmHg. If the result of the decision is 375 mmHg, the operation now moves to step 118. However, if the result of the above decision is NO, i.e., the Pset is below the predetermined value of 375 mmHg, the operation moves to step 117, where a $P_d$ is added to the content of the register ACC. This is done for the reasons described below. When the actual supercharge pressure P normally reaches $P_{min}=320$ mmHg, a decision to be made in the next step, i.e., step 118, will be that integral plus differential control is possible. However, in step 100, when a high intake air flow causes the supercharge pressure to be lowered, such a decision is to be made that the control from a lower supercharge pressure is possible. In other words, in a lower intake air flow zone aiming at the target supercharge pressure of 375 mmHg, a decision is made for the control zone, as to whether the integral plus differential control should be performed from the comparison of the actual supercharge pressure P, with the preset supercharge pressure $P_{min}$ (=320 mmHg). However, in a high intake air flow zone where the target supercharge pressure falls below 375 mmHg, it is preferable to decrease the preset supercharge pressure $P_{min}$ for the decision, so as to secure a control zone where integral and differential control are performed. To this end, the actual supercharge pressure P stored in the register ACC may be compared with the value $P_d$ subtracted from the $P_{min}$ a predetermined value. However, the same result can be also obtained from the comparison of the $P_{min}$ with a value in which the predetermined value $P_d$ has preliminarily been added to the actual supercharge pressure P. The predetermined value in this case corresponds to $P_d$ which may be a constant or may be changed in accordance with the intake air flow $Q_A$.

In step 118, a decision is made if the content of ACC is above the $P_{min}$. If the result of the decision in step 118 is YES, that is, the content of the register ACC is above the $P_{min}$, the operation moves to step 127 (FIG. 5C) as integral plus differential control is possible.

However, if the result of the above decision is NO, that is, the content of ACC is below, the $P_{min}$ and the integral plus differential control is not possible, the operation moves to step 119, where another decision is made. Namely, in step 119, a decision is made if the actual intake air flow rate $Q_A$ is below a predetermined intake air flow $Q_2$. If the result of the decision is YES, the operation now moves to step 120, where various control flags are reset and the initialization for control variables are carried out and in the next step, i.e., step 121, rewriting of the learning amounts $L_1$ and $L_2$ for both VN and WG are performed.

If the result of the decision in step 119 is NO, that is the actual air flow rate $Q_A$ is larger than the predetermined air flow $Q_2$, the operation goes to step 122 in order to avoid the resetting of the above control flags and the initialization of the control variables. The actual supercharge pressure is instantaneously lowered in the high intake air flow zone. Namely, during the full accelerated condition at the high intake air flow, when the operation of the accelerator is returned, there often occurs a case where the decrease in the intake air flow rate is slower than the decrease in the supercharge pressure. In this case, the intake air flow is maintained high and the actual supercharge pressure becomes smaller than the $P_{min}$ in spite of the fact that the control is being performed in the WG side. Accordingly, if the initialization of the control variables as well as the reset of the control flags are to be carried out in this case, the integral value $INT_2$ of the deviation for WG obtained previously will be lost and the control amount for WG will be also decreased, thereby resulting in the deviation of the control when any dispersion of the parts used exists. Accordingly, the reset of the control flags are not carried out in this case.

In step 122, each of the values which is the addition of each correction amount to the basic control duty and which has been stored in the memory locations of M2, $M2+2$ is respectively transferred to the same memory locations as $OUT_1$ and $OUT_2$. Since the upper limit and the lower limit values are provided when storing the values, each of the control amounts is restricted within the limits.

In step 123, another decision is made if the actual intake air flow rate $Q_A$ is below the predetermined decision intake air flow $Q_j$. If the result of the decision is YES, the operation moves to step 124, where the control duties $OUT_1$ and $OUT_2$ is minimized, respectively. This operation is done for increasing durability of the engine without operating the electromagnetic valves 57 and 77 in the low intake air flow condition during the idling condition.

In step 125, a preventive operation for a decision error for the accelerated condition is performed, the detailed explanation of which will be explained later in the acceleration decision operation. After this operation, the operation now moves to step 212.

If the result of the decision in step 118 is that the integral plus differential control is possible in the particular control zone in question, the operation is to move to step 127. In subsequent steps after this step 127, each of the control amounts for both VN and WG is calculated in accordance with the results of the decisions to be carried out in steps 101 through 106 which determine if the control is being performed either on the VN side or on the WG side.

First of all, in step 127, a decision is made if the control flag $FL_1$ is set at "1". If the result of the decision is YES, i.e., $FL_1=1$, the operation moves to step 128, where the integral value $INT_2$ of the deviation $\Delta P$ for WG obtained at a previous time is added to the deviation $\Delta P'$ at the current time.

On the other hand, if the result of the above decision is NO, i.e., the control flag is $FL_1="0"$, the operation now moves to step 129, where the integral value $INT_1$ of the deviation $\Delta P$ obtained at a previous time for VN is added to the deviation ΔP' at the current time. After this operation, it now moves to step 130, where a decision is made if the over-boost control has been started. If the result of the decision in step 130 is YES, the operation moves to step 131, where the correction amount $OVR_1$ during the over-boost control is added to the integral value $INT_1$. This operation is done for the purpose of adding the feedforward control amount corresponding to an increment in the target value during the over-boost control thereto.

If the result of the above decision is that the over-boost control has not been started, the operation moves to step 132, where the control flag $FL_1$ is checked if $FL_1 = "1"$. If the result of this decision is NO, the operation moves to step 133 as the control should be performed on the WG side. In step 133, the integral value $INT_1$ of the deviation ΔP is subtracted by a predetermined value. After the feedback control is switched from the VN side to the WG side, the control amount for VN is to be gradually subtracted from the control amount just before the changing-over.

This operation is done because if the control amount for VN is maintained at the control amount just before the changing-over, even after the feedback control has been switched to the WG, the exhaust gas flow speed at the guide path 40 becomes fast as the exhaust gas flow is increased, thus lowering the exhaust gas pressure. As a result, the lowering in the pressure causes the movable tongue member 45 to make a pivotal movement in the direction of the closure of the guide path 40, which would result in the lowering of the capacity of the turbocharger.

On the other hand, if the predetermned value is subtracted from the integral value $INT_1$ of the deviation ΔP on the VN side, the movable tongue member 45 is pivoted in the direction of opening of the guide path 40 to the fully opened condition. As a result, a sufficient exhaust gas flow can be secured even entering into the WG side control, thus enabling maximum turbocharger performance to be demonstrated.

Returning to the result of the decision of step 132, if the result of the decision is YES, i.e., the control flag is $FL_1 = "0"$, the operation moves to step 134, where the integral portion of the control is calculated from $K.INT_1 \times \Delta P$ and the result is added to the content of M2. Here, $K.INT_1$ indicates the operational integral gain. At the same time, the integral portion for the learning control amount is stored in the RAM as the learning amount $L'_1$ at this time for VN. After this calculations, the operation now moves to step 135, where the $INT_2$ portion for WG is calculated from $K.INT_2 \times \Delta P$ and its result is added to the content of M2+2. Here, the constant $K.INT_2$ indicates the operational integral gain. At the same time, the $INT_2$ portion is stored in the RAM as a learning amount $L_2'$ for the WG control.

In step 136, the D portion is calculated from $KD \times (\Delta P - \Delta P')$, where KD indicates an operational differential gain, and the result of the calculation is stored in the memory location M1 in the RAM. More specifically a decision is made from the control flag condition $FL_1$ whether the control is being performed on the VN side or WG side. If the result of the decision is that the control is being carried out in the VN control zone, the gain $KD_1$ for VN is calculated while if the control is carried in the WG, the gain $KD_2$ for WG is selectively calculated. After this calculations, the operation now moves to step 137, where another decision is made if the control flag $FL_1$ is "0". If the result of the decision is NO, i.e., $FL_1$ "1", the operation moves to step 138, where the $D_2$ portion is added to the control amount for the WG and the result of the calculation is stored in M2+2.

On the other hand, however, if the result of the decision is YES, i.e., $FL_1 = "0"$, the operation moves to step 139, where the $D_1$ portion is added to the control amount for the VN and its reuslt is stored in M2.

In step 140, the deviation $\Delta P' = P_{set} - P'$ at this time is stored in the RAM in order to calculate the D portion to be carried out in the next time operation.

In steps 141 and 142, the values stored in the memory locations M2 and M2+2 (the results of calculation on each corrected amount to the basic control duty) are read from the memory locations M2 and M2+2 in the RAM as the final control duty $OUT_1$ and $OUT_2$. As the upper and lower limits are provided when storing the values, each of the control values for the VN and the WG are restricted within a ranged defined the limits. After these operations, the processing now moves to step 212 of a control program for the VN and WG.

Description is now made for the over-boost control for improving the acceleration performance of the vehicle by increasing temporarily the supercharge pressure at the suddenly accelerated condition. Basically, the over-boost control is achieved by the correction of the feedforward control amount and by increasing the target supercharge pressure.

Figure 6A:
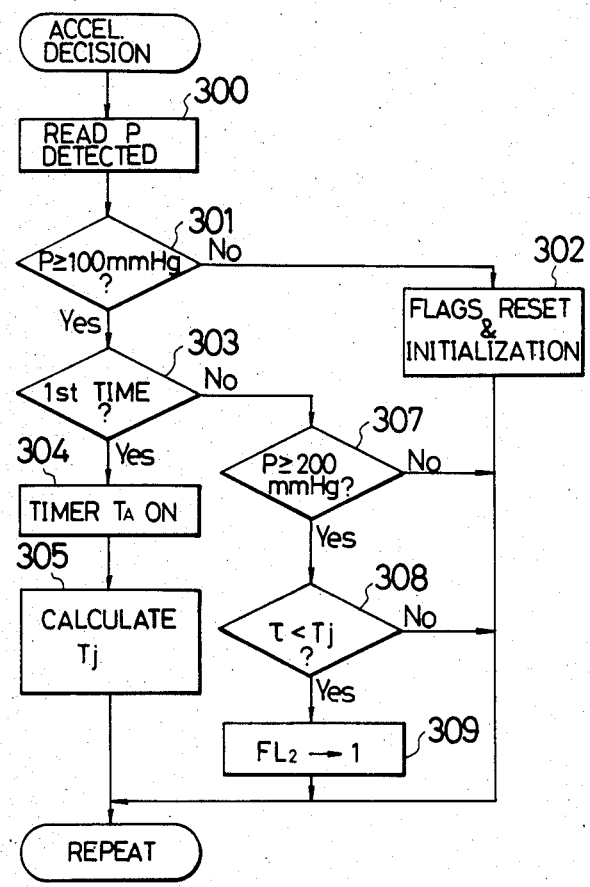

FIG. 4(B) shows a control flow chart for the over-boost control in which various flags are set or reset. FIG. 6(A) shows a control flow chart for the suddenly accelerated condition determining and processing. The processing of this control shown in FIG. 6(A) is executed once for every 10 ms, different from the foregoing operations and processings.

After start of the operation, in step 300, the actual supercharge pressure P is stored in the RAM and the operation goes to step 301, where a decision is made if the actual supercharge pressure thus detected is greater than or equal to a predetermined supercharge pressure $P_{set} = 100$ mmHg. If the result of the decision is NO, that is, $P < P_{set}$, the operation moves to step 302, where various control flags are reset and the initialization of various control variables are performed.

However, if the result of the above decision is YES, the operation now moves to step 303, where a decision is made if $P > P_{set} = 100$ mmHg occured for the first time. If the result of the decision is YES, the operation goes to step 304, where a timer $T_A$ for measuring the time duration of the accelerated condition is started. After this operation, the operation goes to step 305, where a decision reference time $T_j$ for determining the suddenly accelerated condition is calculated from the following equation in accordance with engine speed, gear positions etc. at the preset supercharge pressure value of $P_{set} = 100$ mmHg and it is stored in the RAM. Namely, the decision reference time $T_J$ can be defined from a decision line in the experiment values shown in FIG. 12(B). That is;

$$T_j = \frac{156250}{\text{engine speed (rpm) at 100 mmHg}} \times 10 \text{ ms}$$

If the value of the time $T_A$ for measuring the accelerated time falls above the decision line, it is determined that it is not suddenly accelerated condition. However, if the value of the time $T_A$ falls below the decision line it is determined as being in the suddenly accelerated condition.

Figure 12A:
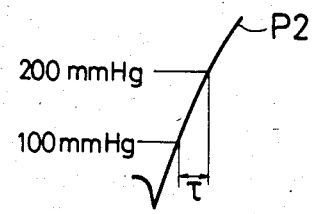
Figure 12B:
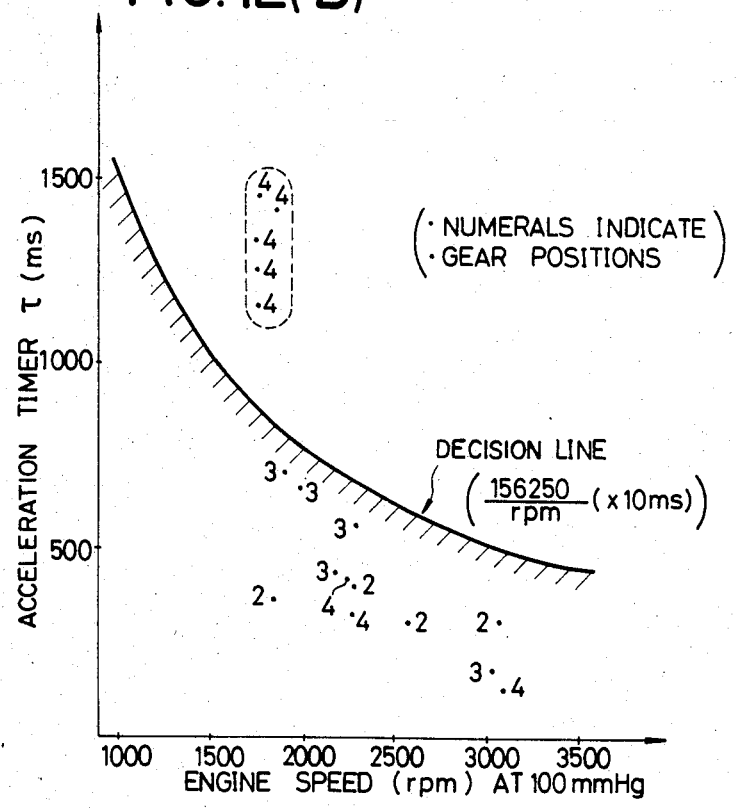

In FIG. 12(B), the numbers indicated in the drawing, such as 2, 3, 4 show each of the gear positions 1 to 4 of the transmission, selected. Among these gear positions, there is no problem up to the third speed of the gear position as they fall the area below the decision line. However, in the low engine speed zone such as at fourth speed gear position 4, the accelerated time $\tau$ during the change in the actual supercharge pressure from 100 mmHg to 200 mmHg is actually distributed in the area above the decision line as shown in the dotted line circle. Accordingly, it is necessary that the decision line be moved to an area beyond the very zone indicated by the dotted circle with respect to the fourth speed, low speed zone of the gear. The decision reference time $T_j$ has thus been settled by taking into consideration of the above fact, with a predetermined value being added to the decision line in FIG. 12(B). For these reasons, the gear positions are taken into consideration when defining the decision reference time value.

If the result of the decision in step 303 is NO, that is $P > P_{set}$ occured more than twice, the operation now moves to step 307. In step 307, a decision is made if the actual supercharge pressure P is above a second predetermined target supercharge pressure value of 200 mmHg. If the result of this decision is NO, that is the actual supercharge pressure P is below the value $P_{set}$, no decision for the suddenly accelerated condition is carried out.

However, if the result of the above decision is YES, i.e., the P is equal to or more than $P_{set} = 200$ mmHg, the operation goes to step 308, a decision is made if the value of the timer is below the predetermined decision reference time $T_j$ described in the foregoing. Namely, the duration of the accelerated time measured by the timer, which is shown in FIG. 12(A) (the time during which the actual supercharge pressure is changed from 100 to 200 mmHg as described above) is below the reference time $T_j$ determined in step 305. If the result of the decision is YES, that is $\tau < T_j$, the operation goes to step 309, where the control flag $FL_2$ is set at "1" since this is the suddenly accelerated condition.

On the other hand, however, if the result of the above decision is NO, the operation, i.e., $\tau \geq T_j$, the operation terminates.

In such a manner as described, a decision for the suddenly accelerated condition and a necessary control for supercharge pressure can be performed. The result of the acceleration control flag bit $FL_2$ condition is used for the VN and WG control shown in FIG. 4(A), the supercharge feedback control shown in FIG. 5 and the over-boost control shown in FIG. 4(B) will be described below.

FIG. 4(B) shows a control flow chart for performing an optimum overboost control. The routine of this control program is executed once before executing the control program shown in FIG. 4(A) for the VN and WG control, so as to obtain necessary information or conditions.

In FIG. 4(B), after starting the operation, in step 214 a decision is made if the over-boost control is terminated properly. This is to check the result of the operations performed in steps 236 to 239 which terminate the over-boost control properly as will be described below.

If the result of the decision is that the control is terminated, the operation goes to step 241, where a processing for gradually lowering the target value, that is, the processing for gradually reducing the feedforward control amount during the over-boost control, is carried out.

On the other hand, if the result of the above decision is NO, i.e., the control has not yet been terminated, the operation goes to step 215, where the condition of the control flag for the suddenly accelerated condition of the vehicle, which has been either set or reset in the processing in FIG. 6(A), is checked. If, in this case, the result of the flag $FL_2$ is set at "0", the operation terminates. However, if the result of the decision is NO, the operation moves to step 216 as it is in the suddenly accelerated condition.

In step 216, a decision is made if the over-boost control is possible in accordance with data such as types of engine, types of vehicles, which have preliminarily been stored in the ROM. If the result of the decision is that the over-boost control is possible, the operation now goes to step 217, where the engine cooling water temperature $T_e$ is checked if it is below a predetermined temperature value, e.g., 100° C. If the result of the checking in step 217 is NO, that is the water temperature is above 100° C., the over-boost control is not performed as abnormal burning of the engine tends to occur.

On the other hand, however, if the result of the above checking is YES, i.e., the engine cooling water temperature $T_e$ is below the predetermined temperature value of 100° C., the operation now moves to step 218, where a control flag $FL_4$ for the WG feedforward correction start is set at "1". After this operation, the operation goes to step 219, where a decision is made if the actual supercharge pressure P exceeds the predetermined supercharge pressure of 250 mmHg. If the result of this decision is NO, the operation terminates. However, if the result of the above decision is YES, i.e., the actual supercharge pressure P exceeds the value $P_{set} = 250$ mmHg, the operation goes to step 221, where another decision is made if the actual supercharge pressure P exceeds the value of 250 mmHg for the first time. If the result of this decision is YES, the operation now goes to step 222.

Figure 16:
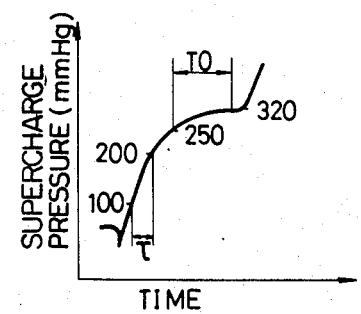

In step 222, a timer $T_M$ for preventing an erroneous decision for the suddenly accelerated condition is started to operate, while the control flag $FL_5$ for the VN feedforward correction start is set at "1". The measuring time of the time $T_M$ for preventing a faulty decision or decision error is checked in step 125 in FIG. 5 for the preventive operation for the suddenly accelerated decision error described in the foregoing. If the time measured by the timer took more than three seconds until the actual supercharge pressure reaches 320 mmHg beyond 250 mmHg, this case is not determined as being the suddenly accelerated condition. Accordingly, the control flag $FL_2$ for determining the sudden acceleration and the control flag $FL_5$ for feedforward correction start on the VN side are set at "0". As shown in FIG. 16, in the accelerated condition from the throttle valve opening of $\frac{1}{4}$ at the second speed position of the gear, the time $\tau$ for determining the suddenly accelerated condition is short and this condition is determined as being the sudden acceleration. Accordingly, this operation is for preventing the degradation of drivability because of a possible sudden fluctuation in the actual supercharge pressure when entering the over-boost control after the acceleration is terminated.

Namely, when the time $T_o$ measured by the timer $T_M$ for preventing the decision error becomes above $T_o \geq 3$ until the actual supercharge pressure reaches 320 mmHg from 250 mmHg, this is not considered as being the sudden acceleration.

Returning to step 221, if the result of the decision in step 221 is that the actual supercharge pressure P exceeds the predetermined supercharge pressure value of 250 mmHg for a second time, the operation goes to step 223, where another decision is made if the actual supercharge pressure P exceeds $P_{set}=345$ mmHg. If the result of this decision is YES, that is $P \geq 345$ mmHg, the operation goes to step 225, where a decision is made as to whether the actual supercharge pressure exceeded the predetermined value of 345 mmHg for the first time. If the result of the decision is YES, the operation moves to step 226, where a timer $T_P$ for measuring the time of increase in the target supercharge pressure is operated so as to increase the target supercharge pressure value $P_{set}$ and the operation terminates.

In step 225, if the result of the above decision is NO, that is P exceeded $P_{set}=345$ mmHg for a second time, the operation goes to step 228, where a decision is made if the timer $T_P$ which was operated in step 226 has elapsed the predetermined time of 0.3 seconds. It the result of this decision is YES, the operation now moves to step 229, where another decision is made if the elapse of the predetermined time of 0.3 seconds measured by the timer $T_P$ is for the first time. If the result of this decision is YES, the operation now goes to step 230.

In step 230, the over-boost control amount is calculated in accordance with the engine cooling water temperature, so as to increase the target supercharge pressure. Namely, as shown in FIG. 10(B), an optimum overboost control amount is calculated in such a manner that the higher the water temperature becomes, the lower the target supercharge pressure $P_{set}$ of 425 mmHg becomes during the over-boost control from a look-up table in accordance with the engine water temperature. In steps after 232 (FIG. 4C), terminating conditions of the over-boost control are checked. Namely, in step 232, a decision is made if the actual supercharge pressure P is above a predetermined value of 375 mmHg.

If the result of this decision is NO, the operation of this routine terminates. However, if the result of this decision is YES, i.e., $P \geq 375$ mmHg, the operation goes to step 234, where another decision is mase if the actual supercharge pressure P exceeded $P_{set}=375$ mmHg for the first time so as to measure the time elapsed after reaching the preset supercharge pressure value of 375 mmHg. If the result of this decision if YES, the operation goes to step 235, where a timer $T_B$ for measuring the over-boost control time is started. However, when the actual supercharge pressure exceeded the value of 375 mmHg for a second time, the operation goes to step 236, where a decision is made if the timer $T_B$ for measuring the over-boost control time as started in step 235 exceeded a predetermined time.

If the result of this decision is YES, the operation goes to step 239, where the over-boost control is terminated. On the other hand, however, if the result of the above decision is NO, the operation now goes to step 237, where a decision is made if knocking level (NK) is larger than a predetermined value. If the result of the knocking level is larger than the predetermined value, i.e., YES case, the over-boost control terminates so as not to produce the knocking phenomina. However, if the result of the above decision is NO, the operation moves to the next step.

Namely, in step 238, a decision is made if the actual intake air flow rate $Q_A$ is equal to or larger than the decision intake air flow rate $Q_j$ for interrupting the over-boost control. If the result of this decision is YES, the operation goes to step 239, where the over-boost control is terminated in order to prevent the abnormal fuel combustion of the engine.

Now, description is made for the learning control for correcting the deviation of the feedforward control amounts for VN and WG. As regards the control for the VN side, the timing for calculating the learning amount is the timing indicated in step 110 in FIG. 5. Namely, the feedback control is switched from the VN side to the WG side. Let it be assumed that the learning amount $L_1$ in this case is the $INT_1$ portion stored in the RAM in step 134 in FIG. 5. This means that the constant deviation portion when the supercharge pressure is controlled by VN is added in advance to the feedforward control amount from the next control.

The actual learning amount calculation will now be described with reference to FIG. 7. After starting the operation of this program, a decision is made if the over-boost control is being performed from the control flag $FL_2$ in step 400. It is also possible to calculate the learning amount even if the over-boost control is not carried out. When performing the over-boost control, however, the value of the $INT_1$ portion is large in order to expand the control area for the VN side. Accordingly, the control accuracy can be improved when the control is performed by this large value. As a result, the calculation for the learning amount is to be carried out just after the over-boost control has been performed in this embodiment. No calculation for the learning amount is carried out in the accelerated condition where no over-boost control is performed.

As described above, when the over-boost control is performed, the operation goes to step 401, the correction amount during the over-boost control is subtracted from the constant deviation $L_1$ obtained from step 134, which is about 15 percent in terms of the control duty value, and the result of the subtraction is used for a new learning amount $L_1'$. This calculation is carried out so as to optimize the basic control duty when the over-boost control is not being performed. In step 402, the new learning amount $L_1'$ is added to the previous learning amount $L_1$ and the resulting value of this calculation is stored in the RAM as a learnt value $VL_1=L_1+L_1'$ for VN. The reason for carrying out this calculation is for the purpose of covering the learnt value to an optimum value. The up-to-data learnt value $VL_1$ of the result thus stored in the RAM is updated when satisfying the feedback control reset conditions and it is reflected to the control the next time. Namely, in step 121 in FIG. 5, the up-to-date learnt value $VL_1$ is updated when the reset conditions of the feedback control, where the actual supercharge pressure P is below the preset value of 320 mmHg and the actual intake air flow $Q_A$ is equal to or smaller than the predetermined intake air flow $Q_j$ for WG is satisfied. This updated result of the learning is reflected in the subsequent control.

The learning control for WG is carried out as follows. The timing for performing the calculation of the learning amount is the condition determined in step 112, i.e., it is performed after 1.2 seconds after the feedback control is switched from the VN side to the WG side. The learning amount is assumed to be the INT portion stored in the RAM as $INT_2$ in step 135. This means that the constant deviation portion when the supercharge pressure is being controlled by WG is added to the feed forward control amount. Actual calculation of the learning amount is carried out as follows. After operation is started, a decision is made in step 404 (FIG. 8) if the time measured by a timer $T_L$ for starting the learning control for WG is above a predetermined time of 1.2 seconds, which was started when the feedback control had been switched to the WG side in step 109 in FIG. 5.

If the result of the decision is NO, that is the measured time is below the predetermined time value of 1.2 seconds, no calculation is performed. However, if the result of the decision is YES, the operation goes to step 405, where the constant deviation $L_2'$ calculated at this time in step 135 in FIG. 5 is added to the learning amount $L_2$ obtained previously and the result is stored in the RAM as a new learnt value $VL_2$, similar to the calculation of the VN side. The up-to-date learnt value $VL_2$ is updated in step 121 in FIG. 5 similarly in the case of the VN side. Such a manner as described, the calculations of the learning amounts for each of VN and WG are performed at an optimum timing, respectively. Each of the values $VL_1$ and $VL_2$ thus updated is added to the basic control amount $BD_2$ or $BD_1$ in steps 203 and 208 in FIG. 4(A), so as to correct the feedforward control amount.

Figure 6B:
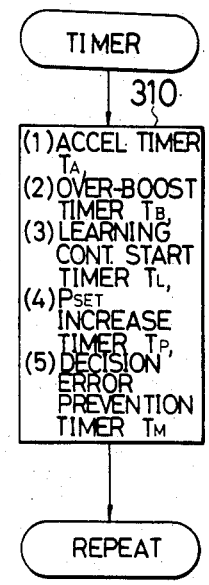

The different timers for measuring different times described in the foregoing embodiment operate respectively in such a manner that they are increased once for every predetermined time such as 10 ms in the processing indicated in FIG. 6(B).

FIG. 17 show each of the characteristic curves between the elapsed time and actual supercharge pressure P, actual intake air flow rate $Q_A$, output control signals $OUT_1$ and $OUT_2$, and the openings of VN and WG. In the figure, the dotted line indicates the characteristic curves according to the prior art and the solid line indicates the characteristic curves according to the present invention.

In FIG. 17, when acceleration is started at the point A, the intake air flow rate $Q_A$ is increased and the actual supercharge pressure P is also increased. The VN side feedback control begins starting at the point B where the actual supercharge pressure P reaches 320 mmHg. When the actual supercharge pressure P exceeded the target supercharge pressure of 320 mmHg, the control duty value of the electromagnetic valve 57 is reduced. As a result, the movable tongue member 45 is operated in the direction of opening of the guide path 40, thus lowering the supercharge pressure. On the other hand, when the actual supercharge pressure P is below the target value of 320 mmHg, the control duty of the electromagnetic valve 57 is increased. As a result the movable tongue member 45 is operated in the direction of closure of the guide path 40, so as to control the actual supercharge pressure to the target supercharge pressure $P_{set}$.

Afterwards, the intake air flow is gradually increased and when it reaches the point C where the feedback control is changed-over from the VN side to the WG side. According to the present invention, the control duty of the electromagnetic valve 57 is gradually decreased after the changing-over the control. As a result, the guide path 40 is gradually opened by the movable tongue member 45 and the exhaust gas flow to the turbine 37 is increased. In this respect, in the case of the prior art, since the control duty of the electromagnetic valve 57 was maintained constant after passing by the point C, the exhaust gas flow was also increased, which resulted in the increase in the gas flow speed passing through the guide path 40, thus lowering the exhaust gas pressure. As a result, the movable tongue member 45 was made a pivotal movement in the direction of closure of the guide path 40. Consequently, according to the prior art, the exhaust gas flow to be supplied to the exhaust gas turbine 37 was suppressed thereby, thus lowering the capacity of the turbocharger.

In the present invention, since the guide path 40 is gradually opened after passing through the point C, a sufficient exhaust gas flow can be secured even after entering into the WG control, thus enabling maximum performance of the turbocharger to be demonstrated. This means that the supercharge performance of the turbocharger can be guaranteed to operate in the fully opened operating zone, hence improving the acceleration performance of the engine.

As described in the foregoing embodiments according to the present invention, a method of an apparatus for controlling supercharge pressure are constructed in such a manner that the capacity changing means for changing the ratio A/R of the turbine and the exhaust bypass valve means are feedback-controlled based upon actual supercharge pressure in accordance with the operating conditions of the engine, any of the operating zones where the feedback control is performed by either the capacity changing means or the exhaust bypass valve means is selected in accordance with the results of decisions by decision making means for determining a particular operating zone to be feedback-controlled, so as to perform each control only in a predetermined operating zone, and a control amount for the capacity changing means can be controlled in the direction of gradual increase in the capacity of the turbine after the control is changed-over from the capacity changing means to the exhaust bypass valve means, thereby guaranteeing the supercharge performance of a turbocharger in the full operating condition of the turbocharger as well as strikingly improving acceleration performance of the vehicle.

While the invention nas been described in its preferred embodiment, it is to be understood that the words which have been used are words of description rather than limitation and that various changes and modifications may be made within the purview of the appended claims without departing from the true scope and spirit of the invention in its broader aspects.

What is claimed is:

1. A supercharge pressure control apparatus for a turbocharger of an engine, said turbocharger having a compressor and a turbine, said apparatus comprising:
   (a) means for detecting at least supercharge pressure and airflow rate into said engine;
   (b) first conduit means for directing exhaust gas from said engine to said turbine;
   (c) a tongue member positioned adjacent said turbine in the path of said exhaust passing from said engine to said turbine and moveable to increase or decrease an opening of the first conduit to said turbine;
   (d) first control means for controlling said tongue member for variably controlling the flow of exhaust gas to said turbine, said first control means responsive to a first control signal;
   (e) a bypass conduit for bypassing exhaust gas from said engine around said turbine to an exhaust pipe of said engine;

(f) a bypass valve member positioned within said bypass conduit for variably controlling exhaust gas flow through said bypass conduit;

(g) second control means for controlling said bypass valve member, said second control means responsive to a second control signal;

(h) a control unit responsive at least to said supercharge pressure and said airflow rate from said detecting means for generating said first and second control signals;

(i) said control unit including first means for comparing said supercharge pressure to a preset value and second means for comparing said airflow rate with a predetermined value;

(j) said control unit generating said first control signal when the results of the comparison of said first comparing means indicates that said detected supercharge pressure is greater than said preset value, said first control means responsive to said first control signal to move said tongue member to feedback control said opening to said turbine to maintain said supercharge pressure at a constant value;

(k) said control unit generating said second control signal when the results of the comparison of said second comparing means indicates that said detected airflow rate is greater than said predetermined value, said second control means responsive to said second control signal to feedback control the amount of exhaust gas flowing in said bypass conduit to maintain said supercharge pressure at said constant level; and (l) said control unit generating another first control signal when the feedback control is switched from the first control means to the second control means, said first control means responsive to said another first control signal to move said tongue member to increase the opening to said turbine.

2. Apparatus as recited in claim 1 wherein said first control means comprises:
(a) a first actuator,
(b) a first electromagnetic value connected to receive said first and other first control signals and operatively connected to move a portion of said first actuator, and
(c) a first linking means connected to said portion of said first actuator and to said tongue member for moving said tongue member in response to movement of said portion of said first actuator.

3. Apparatus as recited in claim 2 wherein said second control means comprises:
(a) a second actuator,
(b) a second electromagnetic valve connected to receive said second control signal and operatively connected to move a portion of said second actuator, and
(c) a second linking means connected to said portion of said second actuator and to said bypass valve for moving said bypass valve in response to movement of said portion of said second actuator.

4. Apparatus as recited in claim 1 wherein said control unit comprises a microprocessor and memory storage means for storing said preset value and said predetermined value.

5. Apparatus as recited in claim 3 wherein said control unit comprises a microprocessor and memory storage means for storing said preset value and said predetermined value.

6. Apparatus as recited in claim 2 wherein said first control signal and said other first control signal have duty cycles which are variable for variably controlling the said first electromagnetic valve.

7. Apparatus as recited in claim 2 wherein said second control signal has a duty cycle which is variable for variably controlling said second electromagnetic valve.

8. Apparatus as recited in claim 6 wherein said second control signal has a duty cycle which is variable for variably controlling said second electromagnetic valve.

9. Apparatus as recited in claim 8 wherein said other first control signal at least partially coincides with said second control signal.

10. Apparatus as recited in claim 2 wherein said other first control signal at least partially coincides with said second control signal.

11. Apparatus as recited in claim 9 wherein said other first control signal at least partially coincides with said second control signal.

12. Apparatus as claimed in claim 1, wherein said first control means is feedforward-controlled after the feedback control has been switched from the first control means to the second control means.

* * * * *